(12) United States Patent
Usami

(10) Patent No.: US 7,831,781 B2
(45) Date of Patent: Nov. 9, 2010

(54) STORAGE SYSTEM AND PATH SWITCHING METHOD

(75) Inventor: Kazuhiro Usami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 106 days.

(21) Appl. No.: 12/007,332

(22) Filed: Jan. 9, 2008

(65) Prior Publication Data
US 2008/0270670 A1    Oct. 30, 2008

(30) Foreign Application Priority Data
Apr. 26, 2007    (JP)    ............... 2007-117082

(51) Int. Cl.
G06F 12/00    (2006.01)
G06F 13/00    (2006.01)
G06F 13/28    (2006.01)
G06F 15/173   (2006.01)
G06F 11/00    (2006.01)

(52) U.S. Cl. ............... 711/154; 711/162; 711/E12.001; 709/238; 714/6

(58) Field of Classification Search ............... 711/154, 711/162; 709/238; 714/6
See application file for complete search history.

(56) References Cited

U.S. PATENT DOCUMENTS 6,052,341 A * 4/2000 Bingham et al. ............ 711/112

| | | | | |
|---|---|---|---|---|
| 2004/0098547 | A1* | 5/2004 | Ofek et al. ................... | 711/162 |
| 2004/0128456 | A1* | 7/2004 | Kobayashi et al. .......... | 711/162 |
| 2005/0033911 | A1* | 2/2005 | Kitamura et al. ............ | 711/111 |
| 2005/0102555 | A1* | 5/2005 | Matsumoto et al. ............ | 714/6 |

FOREIGN PATENT DOCUMENTS

| JP | 11-242570  | 2/1998 |
|----|------------|--------|
| JP | 2002-259063| 3/2001 |

* cited by examiner

Primary Examiner—Matt Kim
Assistant Examiner—Michael Alsip
(74) Attorney, Agent, or Firm—Stites & Harbison, PLLC; Juan Carlos A. Marquez, Esq

(57) ABSTRACT

A storage system is characterized by including: a host apparatus for sending various requests and backup-target data; a virtualization apparatus including a volume that stores the data sent from the host apparatus and a virtual volume that stores replicated data for the data; and a virtual disk library apparatus having a controller apparatus that includes an actual volume for the virtual volume and a tape library apparatus having a tape that stores the replicated data stored in the actual volume, and is characterized in that the controller apparatus has a path switching unit for conducting switching, for a plurality of paths for transferring the data, between a path that connects the controller apparatus to the tape library apparatus and a path that connects the controller apparatus to the virtualization apparatus according to a request from the host apparatus.

13 Claims, 27 Drawing Sheets

| HOST PATH NUMBER | PATH STATUS | HOST TRANSFER IN PROGRESS FLAG | NUMBER OF TAPE TRANSFER JOBS |
|---|---|---|---|
| 0A | NORMAL | 0 | 0 |
| 0B | NORMAL | 0 | 0 |
| 0C | NORMAL | 0 | 0 |
| 0D | NORMAL | 0 | 0 |
| 1A | NORMAL | 0 | 0 |
| 1B | NORMAL | 0 | 0 |
| 1C | NORMAL | 0 | 0 |
| 1D | NORMAL | 0 | 0 |

93A  93B  93C  93D (2) WHEN TWO PARALLEL D2D TRANSFER IS STARTED
(AFTER RECEIPT OF REQUEST FOR D2D TRANSFER IN WHICH HOST PATH NUMBERS 0B, 1B, 0C, AND 1C ARE SPECIFIED ACCORDING TO PATH SWITCHING CONTROL PROGRAM)

| HOST PATH NUMBER | PATH STATUS | HOST TRANSFER IN PROGRESS FLAG | NUMBER OF TAPE TRANSFER JOBS |
|---|---|---|---|
| 0A | NORMAL | 0 | 0 |
| 0B | NORMAL | 1 | 0 |
| 0C | NORMAL | 1 | 0 |
| 0D | NORMAL | 0 | 0 |
| 1A | NORMAL | 0 | 0 |
| 1B | NORMAL | 1 | 0 |
| 1C | NORMAL | 1 | 0 |
| 1D | NORMAL | 0 | 0 |
| 93A | 93B | 93C | 93D |

(3) WHEN D2T BACKUP IS STARTED AFTER TERMINATION OF D2D TRANSFER (AFTER RECEIPT OF TERMINATION REPORT ON D2D TRANSFER IN WHICH HOST PATH NUMBERS 0C AND 1C ARE SPECIFIED ACCORDING TO PATH SWITCHING CONTROL PROGRAM)

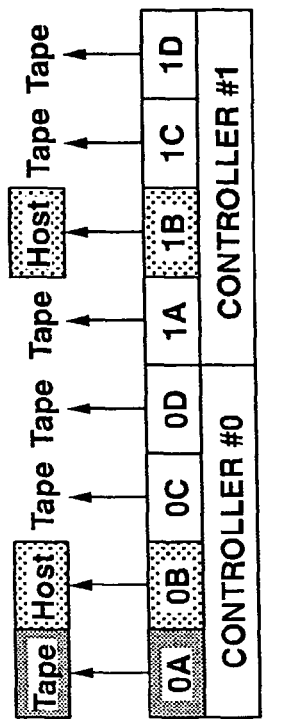

※SELECT FREE HOST PATH WITH CONTROLLER NUMBER FOR D2T BACKUP

| HOST PATH NUMBER | PATH STATUS | HOST TRANSFER IN PROGRESS FLAG | NUMBER OF TAPE TRANSFER JOBS |
|---|---|---|---|
| 0A | NORMAL | 0 | 1 |
| 0B | NORMAL | 1 | 0 |
| 0C | NORMAL | 0 | 0 |
| 0D | NORMAL | 0 | 0 |
| 1A | NORMAL | 0 | 0 |
| 1B | NORMAL | 1 | 0 |
| 1C | NORMAL | 0 | 0 |
| 1D | NORMAL | 0 | 0 |

(4) WHEN D2T BACKUP IS STARTED AFTER TERMINATION OF SECOND D2D TRANSFER
(AFTER RECEIPT OF TERMINATION REPORT ON D2D TRANSFER IN WHICH HOST PATH NUMBERS 0B
AND 1B ARE SPECIFIED ACCORDING TO PATH SWITCHING CONTROL PROGRAM)

| HOST PATH NUMBER | PATH STATUS | HOST TRANSFER IN PROGRESS FLAG | NUMBER OF TAPE TRANSFER JOBS |
|---|---|---|---|
| | NORMAL | 0 | 1 |
| | NORMAL | 0 | 0 |
| | NORMAL | 0 | 0 |
| | NORMAL | 0 | 1 |
| | NORMAL | 0 | 0 |
| | NORMAL | 0 | 0 |
| | NORMAL | 0 | 0 |
| 93A | 93B | 93C | 93D |

93

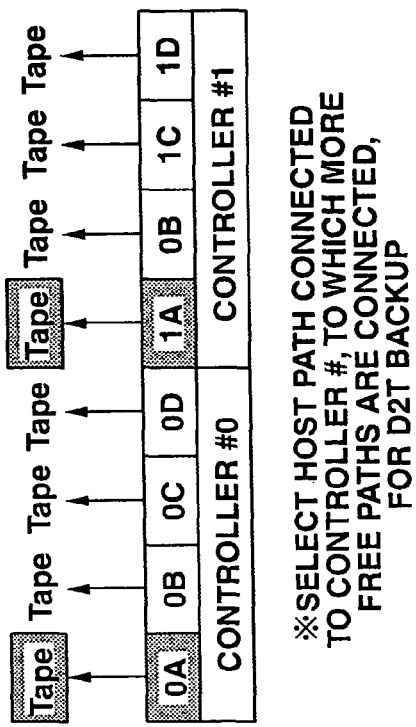

※ SELECT HOST PATH CONNECTED TO CONTROLLER #, TO WHICH MORE FREE PATHS ARE CONNECTED, FOR D2T BACKUP (5) DURING EXECUTION OF EIGHT PARALLEL D2T BACKUP

| HOST PATH NUMBER | PATH STATUS | HOST TRANSFER IN PROGRESS FLAG | NUMBER OF TAPE TRANSFER JOBS |
|---|---|---|---|
| | NORMAL | 0 | 2 |
| | NORMAL | 0 | 1 |
| | NORMAL | 0 | 1 |
| | NORMAL | 0 | 1 |
| | NORMAL | 0 | 2 |
| | NORMAL | 0 | 1 |
| | NORMAL | 0 | 1 |
| | NORMAL | 0 | 1 |

(6) WHEN D2D TRANSFER IS STARTED DURING EXECUTION OF EIGHT PARALLEL D2T BACKUP (AFTER RECEIPT OF REQUEST FOR D2D TRANSFER IN WHICH HOST PATH NUMBERS 0A AND 1A ARE SPECIFIED ACCORDING TO PATH SWITCHING CONTROL PROGRAM)

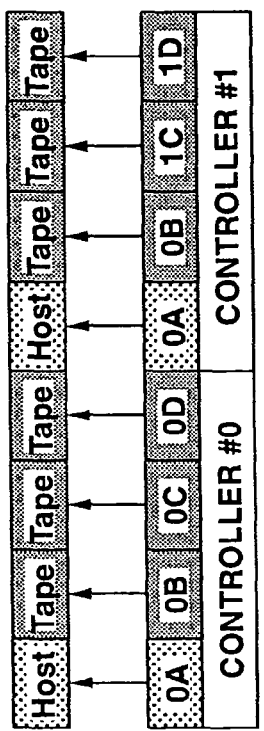

※LOW LOAD PATHS REPLACE HOST PATHS 0A AND 1A FOR D2T BACKUP

| HOST PATH NUMBER | PATH STATUS | HOST TRANSFER IN PROGRESS FLAG | NUMBER OF TAPE TRANSFER JOBS |
|---|---|---|---|
| 0A | NORMAL | 1 | 0 |
| 0B | NORMAL | 0 | 2 |
| 0C | NORMAL | 0 | 2 |
| 0D | NORMAL | 0 | 1 |
| 1A | NORMAL | 1 | 0 |
| 1B | NORMAL | 0 | 2 |
| 1C | NORMAL | 0 | 2 |
| 1D | NORMAL | 0 | 1 |

FIG.25

(7) WHEN D2D TRANSFER IS FURTHER STARTED DURING TRANSFER IN (6) (AFTER RECEIPT OF D2D TRANSFER REQUEST IN WHICH HOST PATH NUMBERS 0C AND 1C ARE SPECIFIED ACCORDING TO PATH SWITCHING CONTROL PROGRAM)

| HOST PATH NUMBER | PATH STATUS | HOST TRANSFER IN PROGRESS FLAG | NUMBER OF TAPE TRANSFER JOBS |
|---|---|---|---|
| 0A | NORMAL | 1 | 0 |
| 0B | NORMAL | 0 | 3 |
| 0C | NORMAL | 1 | 0 |
| 0D | NORMAL | 0 | 2 |
| 1A | NORMAL | 1 | 0 |
| 1B | NORMAL | 0 | 3 |
| 1C | NORMAL | 1 | 0 |
| 1D | NORMAL | 0 | 2 |

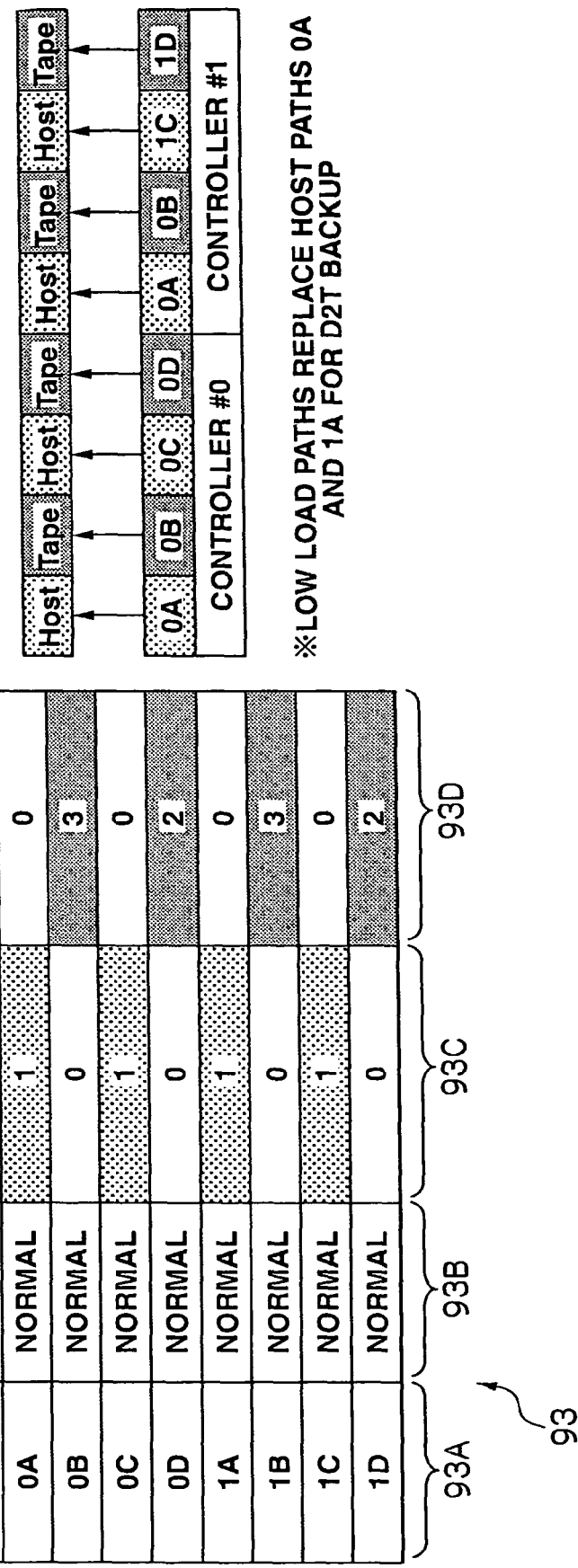

※LOW LOAD PATHS REPLACE HOST PATHS 0A AND 1A FOR D2T BACKUP

FIG.26

(8) AFTER TWO PARALLEL D2D TRANSFER IS FURTHER STARTED DURING TRANSFER IN (7).
(AFTER RECEIPT OF REQUEST FOR D2D TRANSFER IN WHICH HOST PATH NUMBERS 0B, 1B, 0D, AND 1D ARE SPECIFIED ACCORDING TO PATH SWITCHING CONTROL PROGRAM)

| HOST PATH NUMBER | PATH STATUS | HOST TRANSFER IN PROGRESS FLAG | NUMBER OF TAPE TRANSFER JOBS |
|---|---|---|---|
| 0A | NORMAL | 1 | 0 |
| 0B | NORMAL | 1 | 0 |
| 0C | NORMAL | 1 | 0 |
| 0D | NORMAL | 1 | 0 |
| 1A | NORMAL | 1 | 0 |
| 1B | NORMAL | 1 | 0 |
| 1C | NORMAL | 1 | 0 |
| 1D | NORMAL | 1 | 0 |

93A — 93B — 93C — 93D
93

※ ENTIRE D2T BACKUP IS INTERRUPTED AND WAITS TO BE RESTARTED UNTIL HOST PATH BECOMES FREE

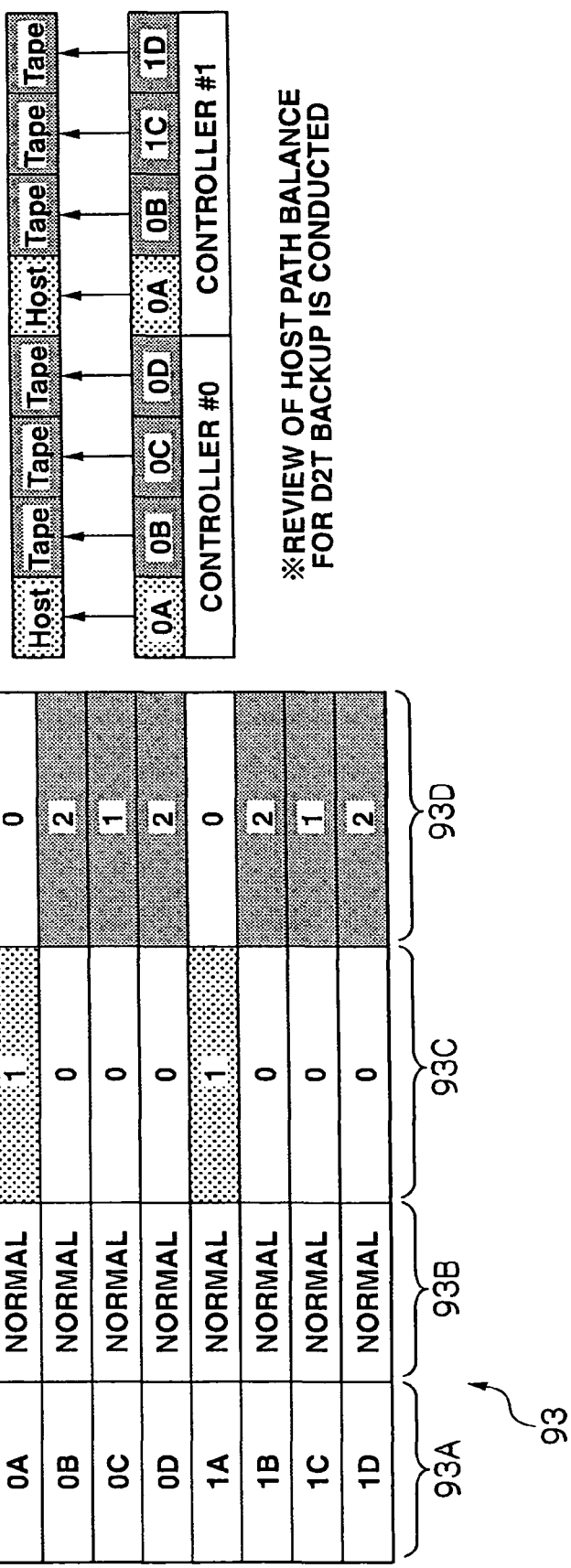

STORAGE SYSTEM AND PATH SWITCHING METHOD

CROSS-REFERENCES TO RELATED APPLICATIONS

This application relates to and claims priority from Japanese Patent Application No. 2007-117082, filed on Apr. 26, 2007, the entire disclosure of which is incorporated herein by reference.

BACKGROUND

The invention relates to a storage system and a path switching method, and particularly relates to a technique of performing backup or restoration of data using an externally-connected storage apparatus.

A conventional example of a virtual disk library apparatus for replicating data from a general computer called a business server is a virtual disk library apparatus using: a tape library apparatus using a magnetic tape cartridge or a logical volume provided in a storage area of a physical volume.

Also, there is a virtualization apparatus that is connected between a business server and a virtual disk library apparatus and provides the business server with a virtual logical volume (hereinafter simply referred to as "virtual volume") in a storage area of a physical disk.

A method for backing up data from a business server by utilizing the above apparatuses is as follows. First, data from a business server is stored in a logical volume created in a storage area of a physical disk (hereinafter referred to as "logical volume") provided in a virtualization apparatus. Then, the data in the logical volume is replicated in another logical volume on a per-volume basis by backup processing. The replicated data from the data is stored in a virtual volume, but is actually stored in a logical volume in a virtual disk library apparatus externally connected to the virtualization apparatus.

Here, backup processing needs to be performed for plural generations with the purpose of protecting data and improving reliability. Backup processing is generally executed on an inexpensive tape library apparatus. As described above, replicated data is stored in a tape library apparatus via a virtualization apparatus.

Incidentally, a technique is disclosed in JP 11-242570 A in which: a magnetic disk apparatus using a magnetic disk and a tape library apparatus are stored in a virtual disk library apparatus; and data backup and data restoration are performed between the magnetic disk apparatus and the tape library apparatus to achieve capacity management for data storage and promotion of access efficiency.

Moreover, a technique is disclosed in JP 2002-259063 A in which: a single communication port for conducting data transfer between a host and a storage control apparatus, cache memory for storing control information and data from the host, a storage apparatus composed of disk devices, etc. for storing data from the host, and a control unit for controlling the communication port, the cache memory, and the storage apparatus are provided; and communication processing is multiplexed in a port control unit having the communication port, or switching of communication ports is conducted depending on circumstances, thereby executing communication processing.

However, in conventional backup processing, the virtualization apparatus and the tape library apparatus must be connected to each other via a dedicated path of a dedicated port due to a characteristic that the tape library apparatus conducts data write sequentially.

Also, in conventional backup processing, backup processing from the virtualization apparatus to the tape library apparatus is executed after the completion of backup processing from the business server to the virtualization apparatus.

Therefore, in conventional backup processing, the dedicated port for connecting the virtualization apparatus with the tape library apparatus cannot be used in backup processing from the virtualization apparatus to the tape library apparatus, and the dedicated port for connecting the business server with the virtualization apparatus cannot be used in backup processing from the business server to the virtualization apparatus.

Accordingly, conventional backup processing has a problem in that a data transfer band is not effectively used, which leads to reduced performance of the entire system. The same applies to restoration processing.

SUMMARY

The present invention has been made in light of the above, and an object of the invention is to propose a storage system and a path switching method for improved performance of the entire system.

In order to solve the above-mentioned problems, according to the invention, provided is a storage system, characterized by including: a host apparatus for sending various requests and backup-target data; a virtualization apparatus including a volume that stores the data sent from the host apparatus and a virtual volume that stores replicated data for the data; and a virtual disk library apparatus having a controller apparatus that includes an actual volume for the virtual volume and a tape library apparatus having a tape that stores the replicated data stored in the actual volume, the storage system being characterized in that the controller apparatus has a path switching unit for conducting switching, for a plurality of paths for transferring the data, between a path that connects the controller apparatus to the tape library apparatus and a path that connects the controller apparatus to the virtualization apparatus according to a request from the host apparatus.

Accordingly, a data transfer band can be effectively used, and the time for data transfer between the virtualization apparatus and the controller apparatus and that for data transfer between the controller apparatus and the tape library apparatus can be shortened.

Also, according to the invention, provided is a path switching method for a storage system that includes: a host apparatus for sending various requests and backup-target data; a virtualization apparatus including a volume that stores the data sent from the host apparatus and a virtual volume that stores replicated data for the data; and a virtual disk library apparatus having a controller apparatus that includes an actual volume for the virtual volume and a tape library apparatus having a tape that stores the replicated data stored in the actual volume, the path switching method comprising a path switching step of conducting switching, for a plurality of paths for transferring the data, between a path that connects the controller apparatus to the tape library apparatus and a path that connects the controller apparatus to the virtualization apparatus according to a request from the host apparatus.

Therefore, a data transfer band can be effectively used, and accordingly, the time for data transfer between the virtualization apparatus and the controller apparatus and that for data transfer between the controller apparatus and the tape library apparatus can be shortened.

According to the invention, a storage system and a path switching method that improve performance of the entire system can be realized.

BRIEF DESCRIPTION OF THE DRAWINGS

FIG. 21 is a conceptual diagram explaining an example of transition involved in host path switching.

FIG. 22 is a conceptual diagram explaining an example of transition involved in host path switching.

FIG. 24 is a conceptual diagram explaining an example of transition involved in host path switching.

FIG. 25 is a conceptual diagram explaining an example of transition involved in host path switching.

FIG. 26 is a conceptual diagram explaining an example of transition involved in host path switching.

FIG. 27 is a conceptual diagram explaining an example of transition involved in host path switching.

DETAILED DESCRIPTION OF PREFERRED EMBODIMENTS

An embodiment of the present invention will be described in detail with reference to the drawings.

Figure 1:
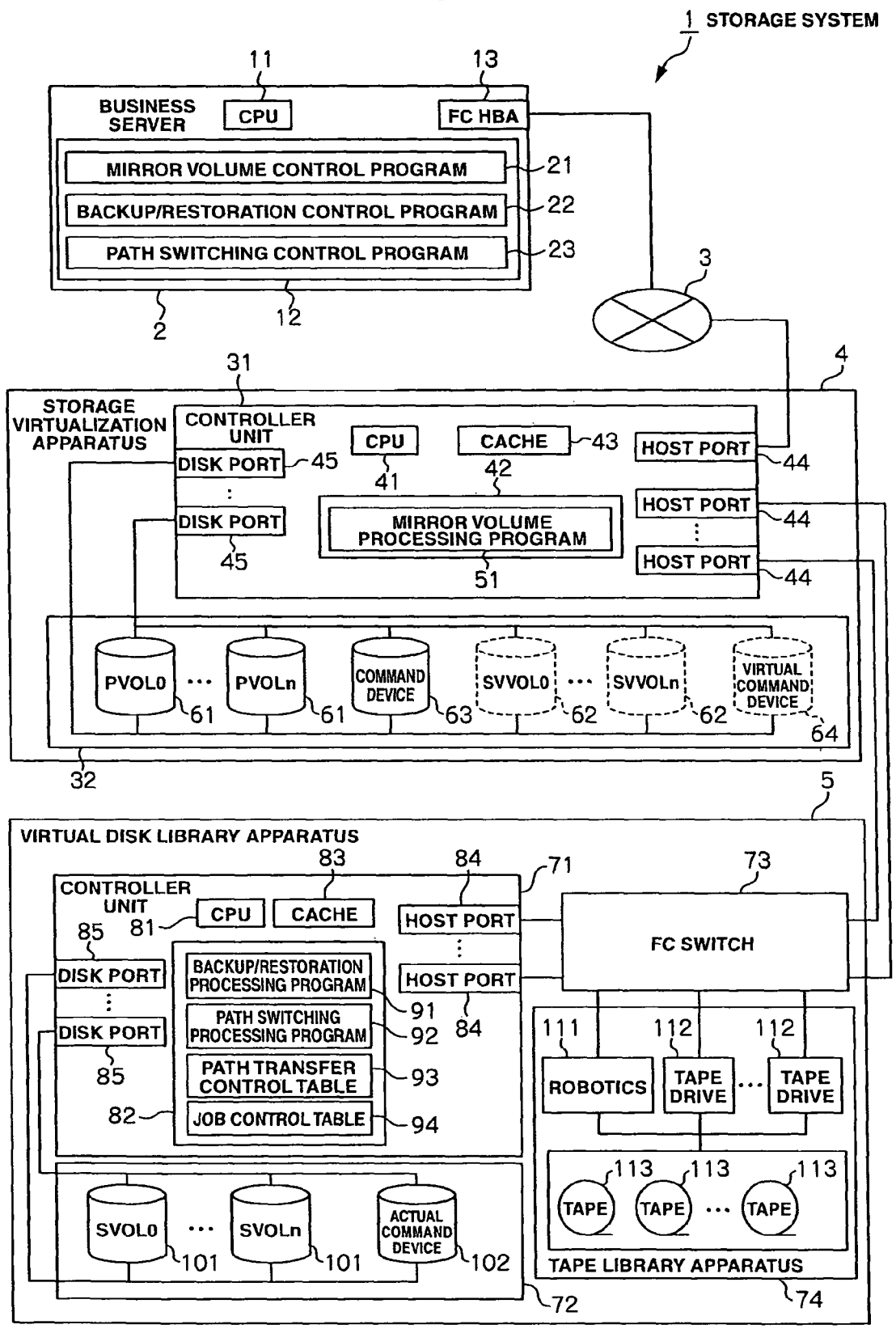
FIG. 1 is a block diagram showing a schematic configuration of a storage system according to an embodiment of the invention.

(1) Configuration of Storage System in Accordance with Embodiment of the Invention FIG. 1 shows a configuration of a storage system 1 in accordance with an embodiment of the invention. The storage system 1 has a configuration in which: a business server 2 (host apparatus) is connected to a storage virtualization apparatus 4 via a network 3; and the storage virtualization apparatus 4 is connected to a virtual disk library apparatus 5.

The business server 2 is a computer device equipped with information processing resources such as a CPU (Central Processing Unit) 11 and memory 12, and is composed of, e.g., a personal computer, work station, or mainframe. The business server 2 is also provided with a fibre channel host bus adapter (FC HBA) 13 for connecting the business server 2 to the storage virtualization apparatus 4. In addition, the business server 2 is equipped with information input devices (not shown in the drawing) such as a keyboard, switch, pointing device, and microphone and information output devices (not shown in the drawing) such as a monitor display and speaker.

The memory 12 in the business server 2 has a mirror volume control program 21, a backup/restoration control program 22, and a path switching control program 23. The programs 21, 22, and 23 will be described later in detail.

The network 3 is composed of, for example, a SAN (Storage Area Network). The communication between the business server 2 and the storage virtualization apparatus 4 via the network 3 is implemented in accordance with Fibre Channel Protocol. Note that the network 3 may be composed of a LAN (Local Area Network), Internet, public line, dedicated line, etc. When the network 3 is a LAN, for example, the communication is implemented in accordance with TCP/IP (Transmission Control Protocol/Internet Protocol). Incidentally, when the network 3 is composed of a LAN, a LAN card, etc. is used instead of the fibre channel host bus adapter 13.

The storage virtualization apparatus 4 is configured to include a controller unit 31 and a device unit 32.

The controller unit 31 is configured as a microcomputer system equipped with a CPU 41, memory 42, cache 43, etc., controls commands and data from the business server 2, and transfers the commands and data between the business server 2 and the virtual disk library apparatus 5.

The controller unit 31 is also equipped with host ports 44 to have the controller unit 31 connected to the business server 2 and disk ports 45 to have the controller unit 31 connected to the device unit 32.

The memory 42 in the controller unit 31 is installed with a mirror volume processing program 51. The mirror volume processing program 51 will be described later in detail.

The cache 43 in the controller unit 31 is mainly used for temporary storage of the data input/output to/from the storage virtualization apparatus 4.

The device unit 32 is composed of plural hard disk drives (not shown in the drawing) that consist of expensive hard disk drives such as FC (Fibre Channel) disks or inexpensive hard disk drives such as SATA (Serial AT Attachment) disks. The hard disk drives are respectively connected to the disk ports 45.

One or more logical volumes (not shown in the drawing) are defined in a storage area provided by the hard disk drives. Commands and data from the business server 2 are read/written in blocks of a specified size from/to these logical volumes.

Each logical volume is assigned a unique identifier (LUN: Logical Unit Number). In this embodiment, that identifier and a unique number (LBA: Logical Block Address) allocated to each block are combined to form an address, and user data is input or output by designating the relevant address.

The logical volumes created in the storage virtualization apparatus 4 are primary volumes (PVOL) 61, virtual secondary volumes (SVVOL) 62, a command device 63, and a virtual command device 64.

Each virtual secondary volume 62 is a logical volume used for backup of each primary volume 61. Even if a failure occurs in the primary volume 61, the primary volume 61 can be restored by using the virtual secondary volume 62.

The command device 63 is a logical volume for receiving commands for command transfer between the business server 2 and the storage virtualization apparatus 4. Moreover, the virtual command device 64 is a logical volume for transferring commands for command transfer between the business server 2 and the virtual disk library apparatus 5.

In terms of attributes, there are actual volumes and virtual volumes. Here, the primary volumes 61 are defined as actual volumes PVOL0 to PVOLn, and the virtual secondary volumes 62 are defined as virtual volumes SVVOL0 to SVVOLn. Also, the command device 63 is defined as an actual volume, and the virtual command device 64 is defined as a virtual volume.

The primary volumes 61, which are the actual volumes PVOL0 to PVOLn, are logical volumes to which a storage is assigned, and data input/output can be actually performed to/from the primary volumes 61.

On the contrary, the virtual secondary volumes 62, which are the virtual volumes SWOL0 to SVVOLn, are virtual and logical volumes that do not exist in reality. Each virtual secondary volume 62 is associated with one or more primary volumes 61 in a pair relation. When a data input/output request is given to the virtual secondary volume 62 by backup processing or restoration processing executed by the storage virtualization apparatus 4, read/write of data from/to a secondary volume 101 (described later), which is associated with the virtual secondary volume 62, in the virtual disk library apparatus 5 described later is performed.

Also, the command device 63, which is an actual volume, is a logical volume to which a storage area is assigned, and can actually receive commands. On the other hand, the virtual command device 64, which is a virtual volume, is a logical volume that does not exist in reality. When a command is given to the virtual command device 64, the command is transferred and stored in an actual command device 102 (described later), which is associated with the virtual command device 64, in the virtual disk library apparatus 5.

In this way, in this embodiment, the data from the business server 2 is stored in the primary volumes 61, which are identical to the actual volumes PVOL0 to PVOLn. Then, copy of the data is stored, as replicated data, in the secondary volume 101 (described later) in the virtual disk library apparatus 5 associated with the virtual secondary volume 62 that is associated with the primary volume 61.

The virtual disk library apparatus 5 is composed of a controller unit 71, a device unit 72, a fibre channel (FC) switch 73, and a tape library apparatus 74.

The controller unit 71 is configured as a microcomputer system equipped with a CPU 81, memory 82, cache 83, etc., and controls commands and data from the business server 2 transferred via the storage virtualization apparatus 4.

The controller unit 71 is also equipped with host ports 84 to have the controller unit 71 connected to the fibre channel switch 73 and disk ports 85 to have the controller unit 71 connected to the device unit 72.

The memory 82 in the controller unit 71 is installed with a backup/restoration processing program 91 and a path switching processing program 92, and stores a path transfer control table 93 and a job control table 94. The programs 91 and 92 and the tables 93 and 94 are described later.

The device unit 72 is composed of plural hard disk drives (not shown in the drawing) that are composed of expensive hard disk drives such as FC (Fibre Channel) disks or inexpensive hard disks such as SATA (Serial AT Attachment) disks. The hard disk drives are respectively connected to the disk ports 45.

The secondary volumes (SVOL) 101, which are one or more actual volumes SVOL0 to SVOLn, and the actual command device 102, which is an actual volume, are defined in a storage area provided by the hard disk drives (not shown in the drawing). The replicated data to be stored in the virtual secondary volumes 62 associated with the secondary volumes 101, which are the actual volume SVOL0 to SVOLn, is read/written in blocks of a specified size from/to the secondary volumes 101. The secondary volumes 101, which are the actual volumes SVOL0 to SVOLn, each have the same configuration as the primary volume 61 in the storage virtualization apparatus 4, and so its description has been omitted.

Similarly, the command sent to the virtual command device 64 associated with the actual command device 102, which is an actual volume, is transferred to the actual command device 102.

The fibre channel switch 73 is connected to the controller unit 31 in the storage virtualization apparatus 4, the controller unit 71, and the tape library apparatus 74 via the Fibre Channel Protocol-employing network 3, and conducts data transfer via switching. The fibre channel switch 73 transfers the replicated data to be stored in the virtual secondary volume 62 and the command to be stored in the virtual command device 64, and also transfers the replicated data, which is to be stored in the secondary volume 101, to the tape library apparatus 74.

The tape library apparatus 74 is configured to include: a CPU (not shown in the drawing) for controlling a robotics 111 that conveys tapes 113; memory (not shown in the drawing) for storing a control program that controls the robotics 111; the robotics 111; tape drives 112; and the tapes 113. Each tape drive 112 is a driving unit for reading/writing replicated data from/to the tapes 113. The tape drive 112 enables storage of the replicated data in the tapes 113. Each tape 113 stores the replicated data stored in the secondary volume 101.

Note that the controller unit 31 in the storage virtualization apparatus 4 and the controller unit 71 in the virtual disk library apparatus 5 have each been duplicated for improvement of reliability (this is not shown in the drawing). In this embodiment, regarding the controller unit 71, one controller unit 71 is referred to as controller #0 controller unit 71, while another controller unit 71 is referred to as controller #1 controller unit 71.

(2) Outline of Path Switching Control

Next, the outline of path switching control in this embodiment will be described. The storage system 1 is characterized in that, according to a request, from the business server 2, for execution of backup processing by transferring replicated data from the primary volume 61 to the virtual secondary volume 62 (in reality, transferring replicated data from the primary volume 61 to the secondary volume 101) or to execute restoration processing by transferring replicated data from the virtual secondary volume 62 to the primary volume 61 (actually transferring replicated data from the secondary volume 101 to the primary volume 61) (hereinafter referred to as "D2D transfer request"), switching is conducted from a host path, which connects the host port 84 of the controller unit 71 in the virtual disk library apparatus 5 to the tape driver 112 of the tape library apparatus 74 via the FC switch 73, to a host path, which connects the host port 84 to the host port 44 in the storage virtualization apparatus 4 via the FC switch 73.

Figure 2:
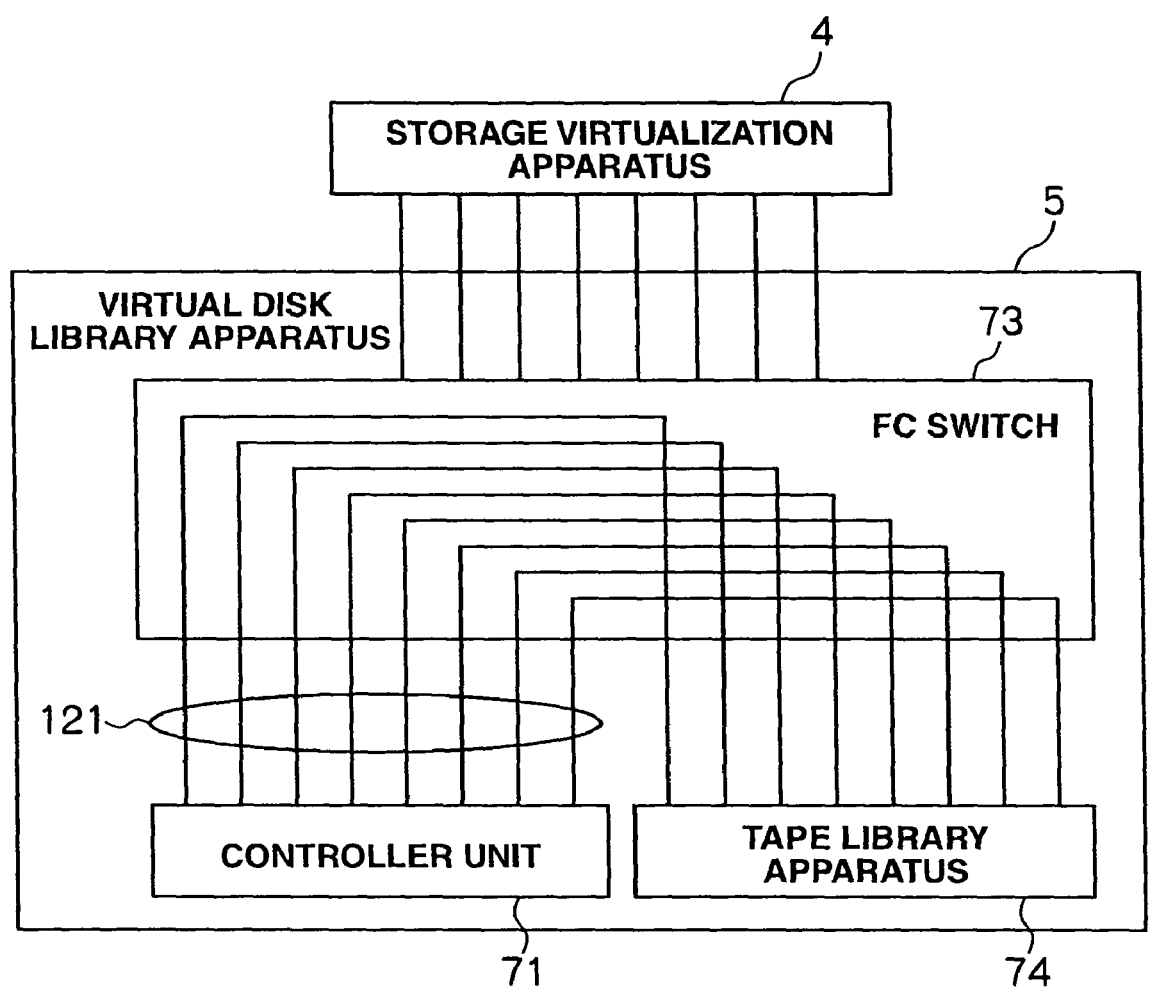
FIG. 2 is a conceptual diagram outlining path switching control.

FIG. 2 shows a host-path connection in an initial state. Host paths 121 are each a path for connecting the controller unit 31 in the storage virtualization apparatus 4 or the tape driver 112 of the tape library apparatus 74 to the controller unit 71 for data transfer.

In this embodiment, in the storage system 1, one controller unit 31 and another controller unit 31 are each provided with four host ports 44, the controller #0 controller unit 71 and the controller #1 controller unit 71 are each provided with four host ports 84, and the tape library apparatus 74 is provided with eight tape drivers 112.

Also, in this embodiment, in the storage system 1, the host ports 84 are connected to the corresponding host ports 44 or tape drives 112 for data transfer. Therefore, the host ports 84 and the corresponding host ports 44 are each provided with the eight host paths 121 corresponding, in number, to the tape drives 112.

In the storage system 1, as shown in FIG. 2, all the eight host paths 121 connect the host ports 84 of the controller unit 71 and the tape drives 112 of the tape library apparatus 74 to each other in the initial state. In other words, in the storage system 1, all the host paths 121 are connected to the tape library apparatus 74 in the initial state.

Figure 3:
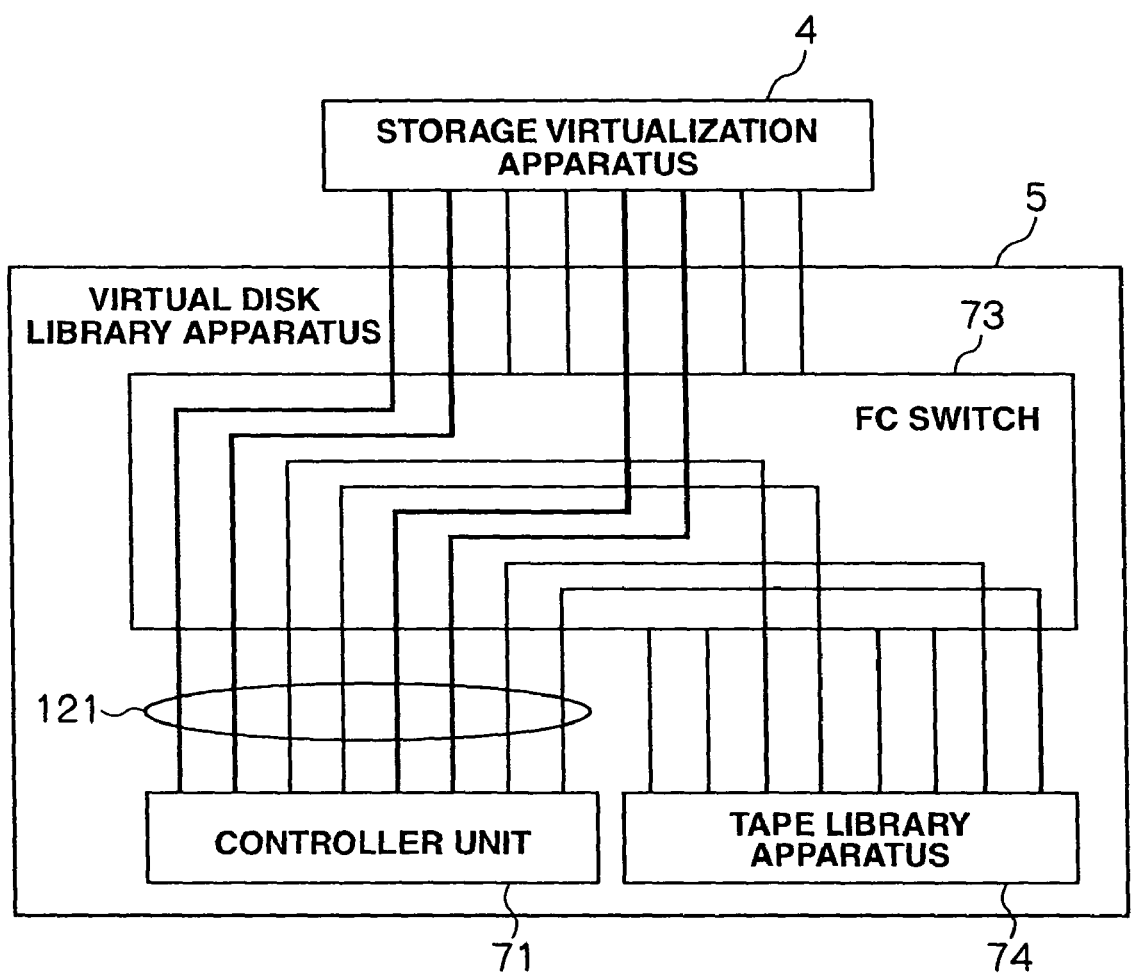
FIG. 3 is a conceptual diagram outlining path switching control.

FIG. 3 shows the connection state of the host paths after the lapse of a predetermined time. In this state of the storage system 1, as a result of switching of the host paths 121 connected between the host ports 84 of the controller unit 71 and the tape drives 112 of the tape library apparatus 74 due to a D2D transfer request from the business server 2, four of the host paths 121 are connected between the host ports 84 of the controller unit 71 and the tape drives 112 of the tape library apparatus 74, while the remaining four host paths 121 are connected between the host ports 84 of the controller unit 71 and the host ports 44 in the storage virtualization apparatus 4.

Figure 4:
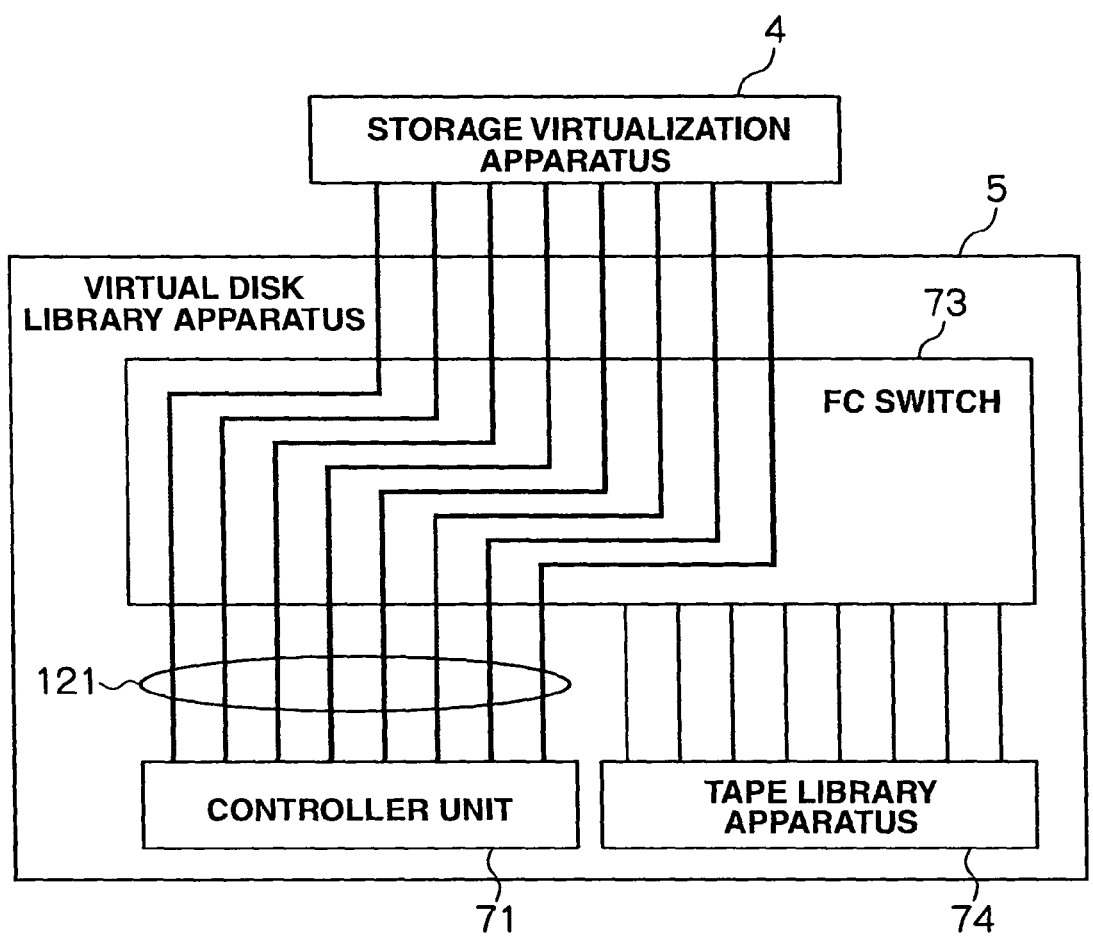
FIG. 4 is a conceptual diagram outlining path switching control.

FIG. 4 shows the connection state of the host paths after a further lapse of a predetermined time. In this state of the storage system 1, switching of the host paths 121 connected between the host ports 84 of the controller unit 71 and the tape drives 112 of the tape library apparatus 74 is conducted according to a further D2D transfer request from the business server 2. As a result, all the eight host paths 121 are connected between the host ports 84 of the controller unit 71 and the host ports 44 in the storage virtualization apparatus 4.

In this way, in the storage system 1, switching is conducted from the host paths 121, which connect the host ports 84 of the controller unit 71 to the tape drives 112 of the tape library apparatus 74 to the host paths 121, which connect the host ports 84 to the host ports 44 in the storage virtualization apparatus 4 according to the D2D transfer request from the business server 2. As a result, a data transfer band can be effectively used in accordance with a data transfer situation. The path switching control of the storage system 1 will be described by specifically using the various tables and programs.

(3) Configuration of Various Tables

Figure 5:
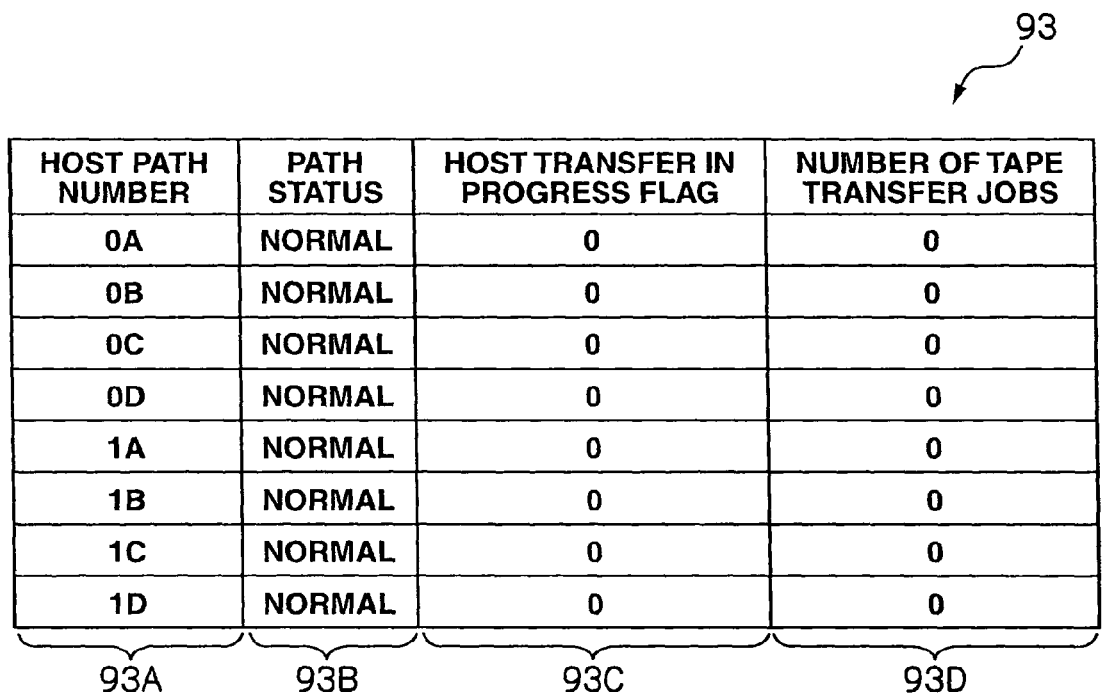
FIG. 5 is a conceptual diagram explaining the configuration of a path transfer control table.

FIG. 5 shows a configuration for the path transfer control table 93. The path transfer control table 93 is configured to include a host-path number management column 93A for managing a host path number for uniquely identifying the host paths 121, a path status column 93B for managing whether the path status of the relevant host path number is normal or abnormal, a host transfer in progress flag column 93C for managing whether the host path 121 of the relevant host-path number is transferring data, and a column 93D for the number of tape transfer jobs for managing the number of data transfer jobs between the controller unit 71 and the tape library apparatus 74.

In this case, the host transfer in progress flag column 93C stores "0" or "1." The host transfer in progress flag column 93C storing "1" indicates that the host path 121 is executing data transfer, while the host transfer in progress flag column 93C storing "0" indicates that the host path 121 is not executing data transfer.

Also, the column 93D for the number of tape transfer jobs stores the number of data transfer jobs between the controller unit 71 and the tape library apparatus 74.

In this embodiment, in the storage system 1, the four host ports 84 of the controller #0 controller unit 71 are assigned the host paths 121 respectively having host path numbers of "0A" to "0D", and the four host ports 84 of the controller #1 controller unit 71 are assigned the host paths 121 respectively having host path numbers of "1A" to "1D."

Regarding a host path with the host path number "0A" stored in the path transfer control table 93, the table indicates that: the path status is normal; the path is not executing data transfer; and the number of data transfer jobs is "0."

Figure 6:
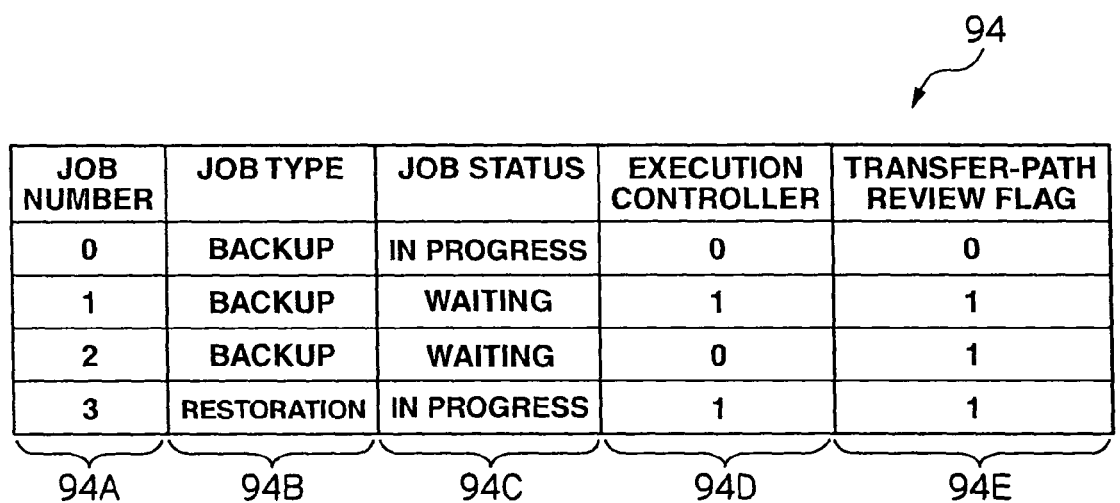
FIG. 6 is a conceptual diagram explaining the configuration of a job control table.

FIG. 6 shows a configuration for the job control table 94. The job control table 94 is configured to include: a job number column 94A for managing a job number for uniquely identifying a job executed by the controller unit 71 according to various requests sent from the business server 2; a job type column 94B for managing job types such as backup and restoration; a job status column 94C for managing job statuses such as the status where a job with the relevant job number is being executed and the status where a job waits to be executed; an execution controller column 94D for managing a controller number (controller #) of the controller unit 71 executing the job with the relevant job number; and a transfer-path review flag column 94E for managing whether review of the host path 121 for data transfer is conducted.

In this case, the transfer-path review flag column 94E stores "0" or "1." The transfer-path review flag column 94E storing "1" indicates that review of the host path 121 is conducted, while the transfer-path review flag column 94E storing "0" indicates that review of the host path 121 is not conducted.

For example, regarding a job with the job number "0" stored in the job control table 94, the table indicates that: the job type is backup; the job status is in-progress; the controller executing the job is the controller #0 controller unit 71; and the review of the host path 121 for data transfer is not conducted.

(4) Processing in Accordance with Various Programs (4-1) Flow of Backup Processing Next, the flow of backup processing in accordance with the various programs in the storage system 1 in this embodiment will be described.

Figure 7:
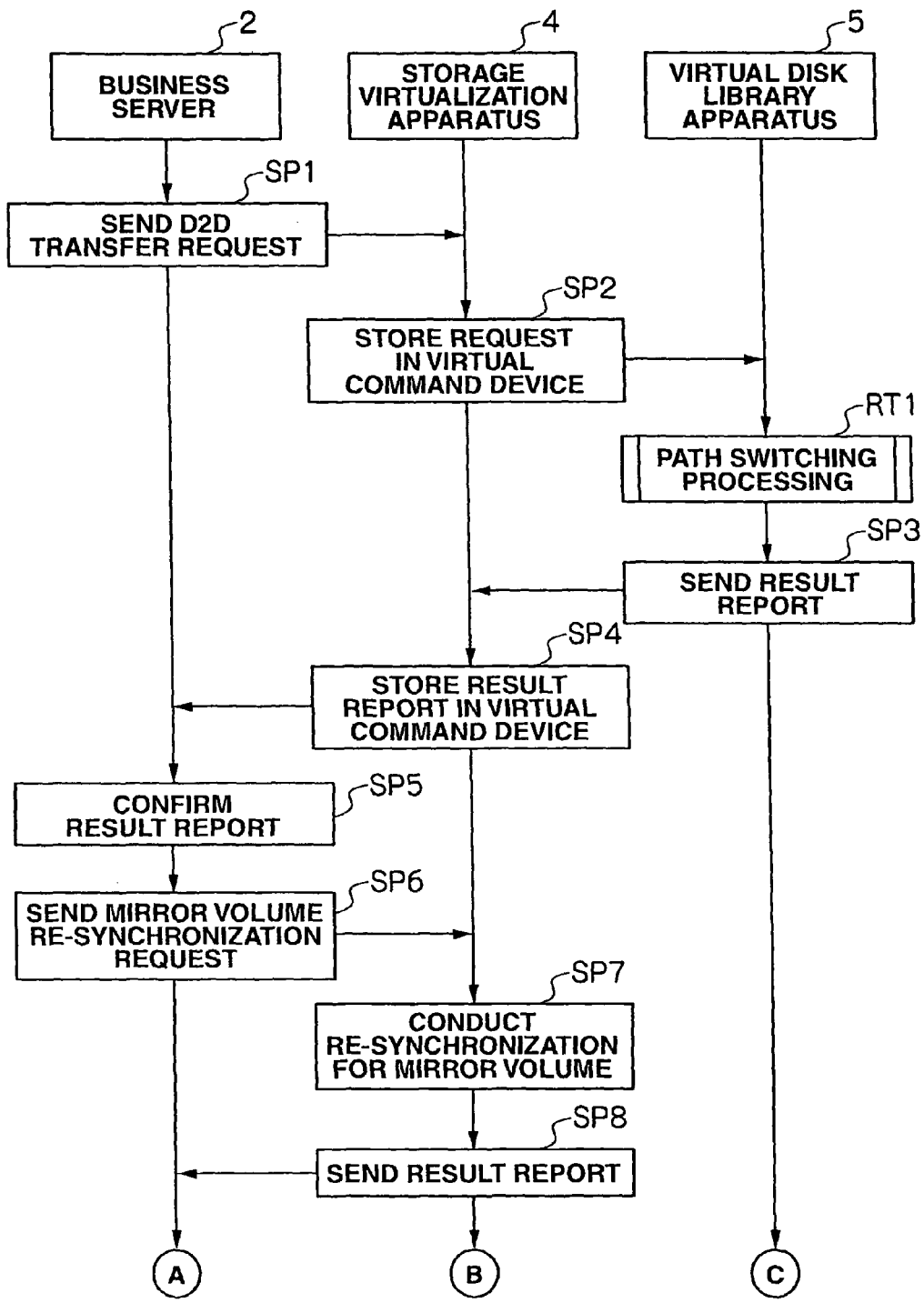
FIG. 7 is a flowchart illustrating a flow of backup processing.
Figure 8:
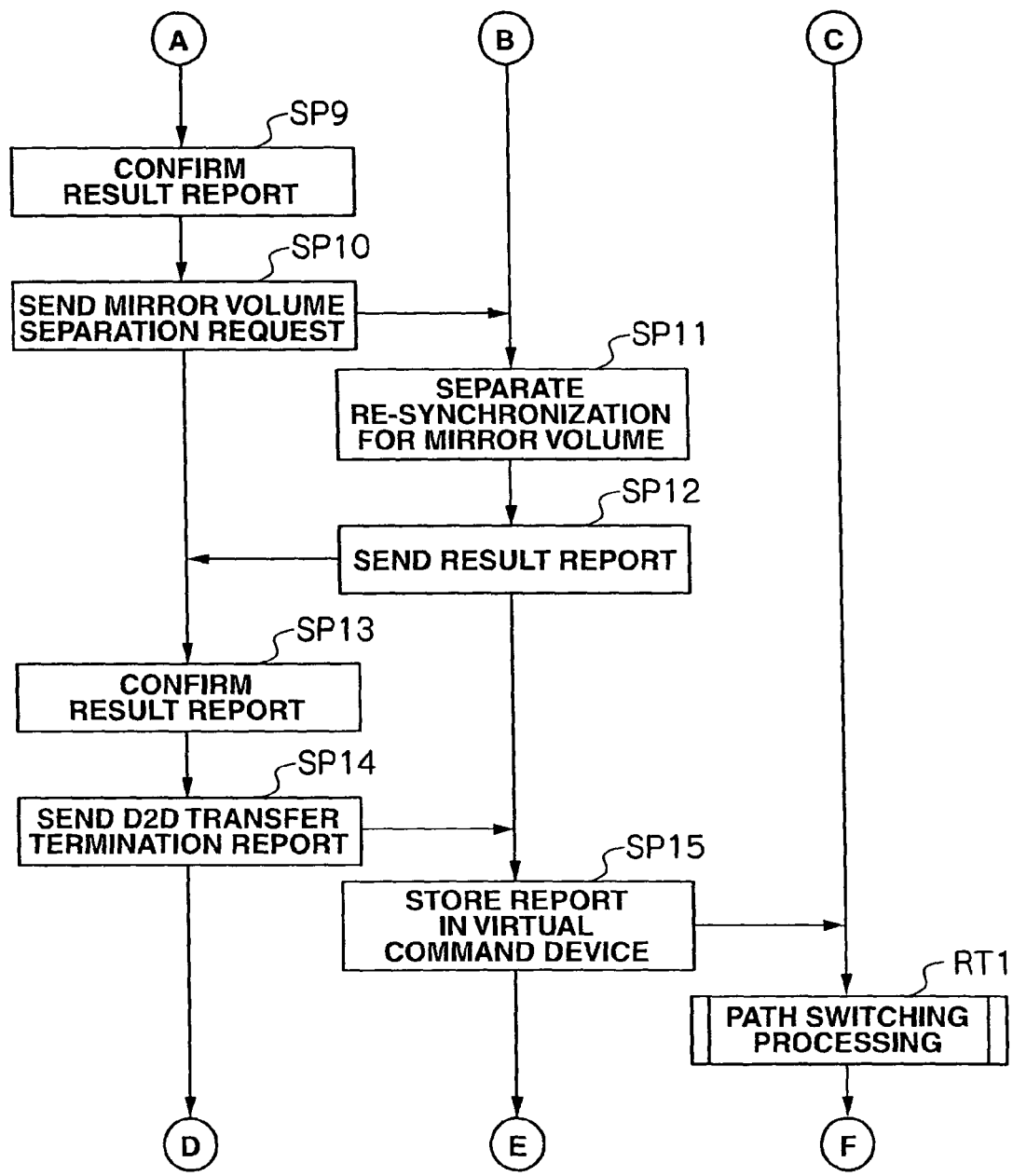
FIG. 8 is a flowchart illustrating a flow of backup processing.
Figure 9:
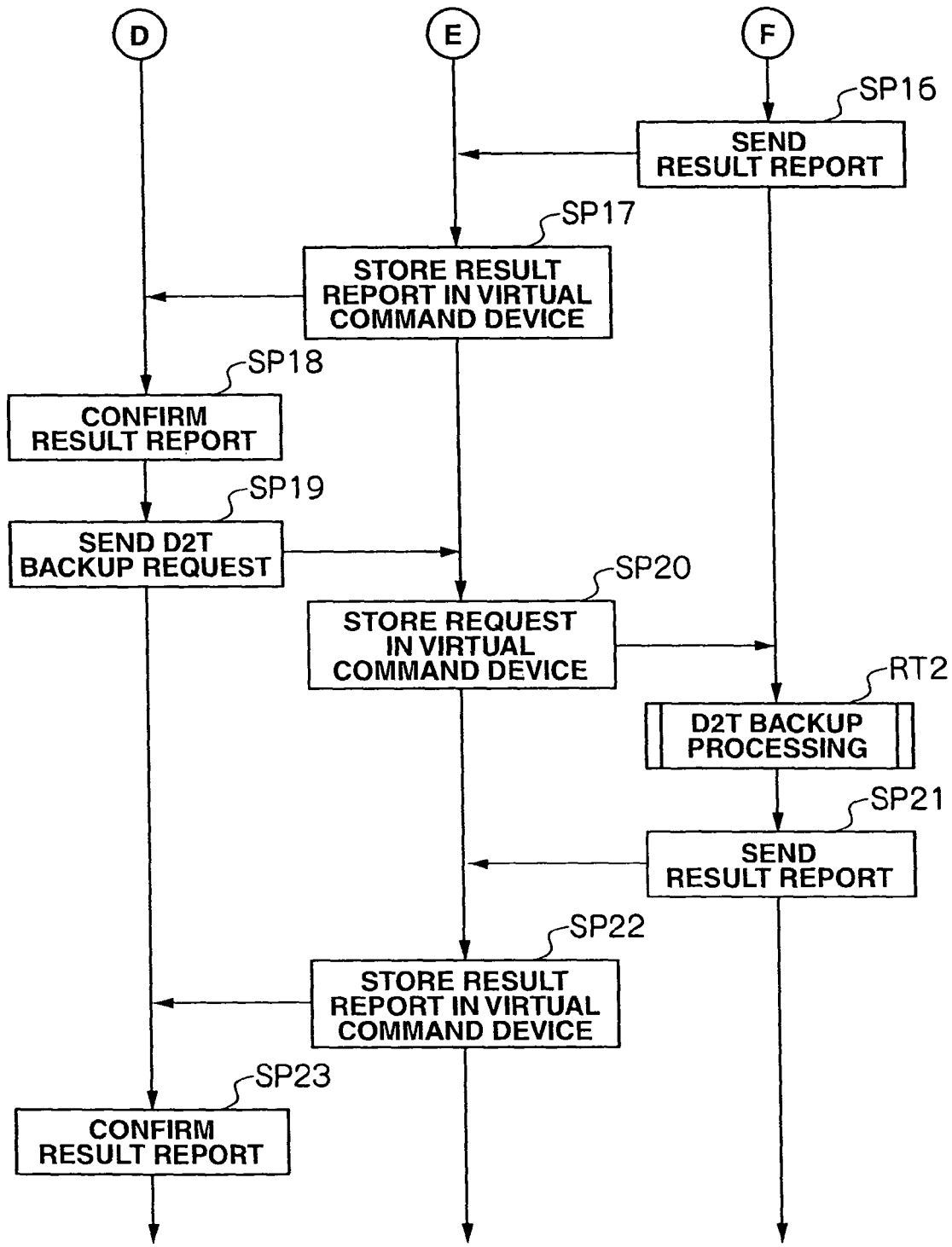
FIG. 9 is a flowchart illustrating a flow of backup processing.
Figure 10:
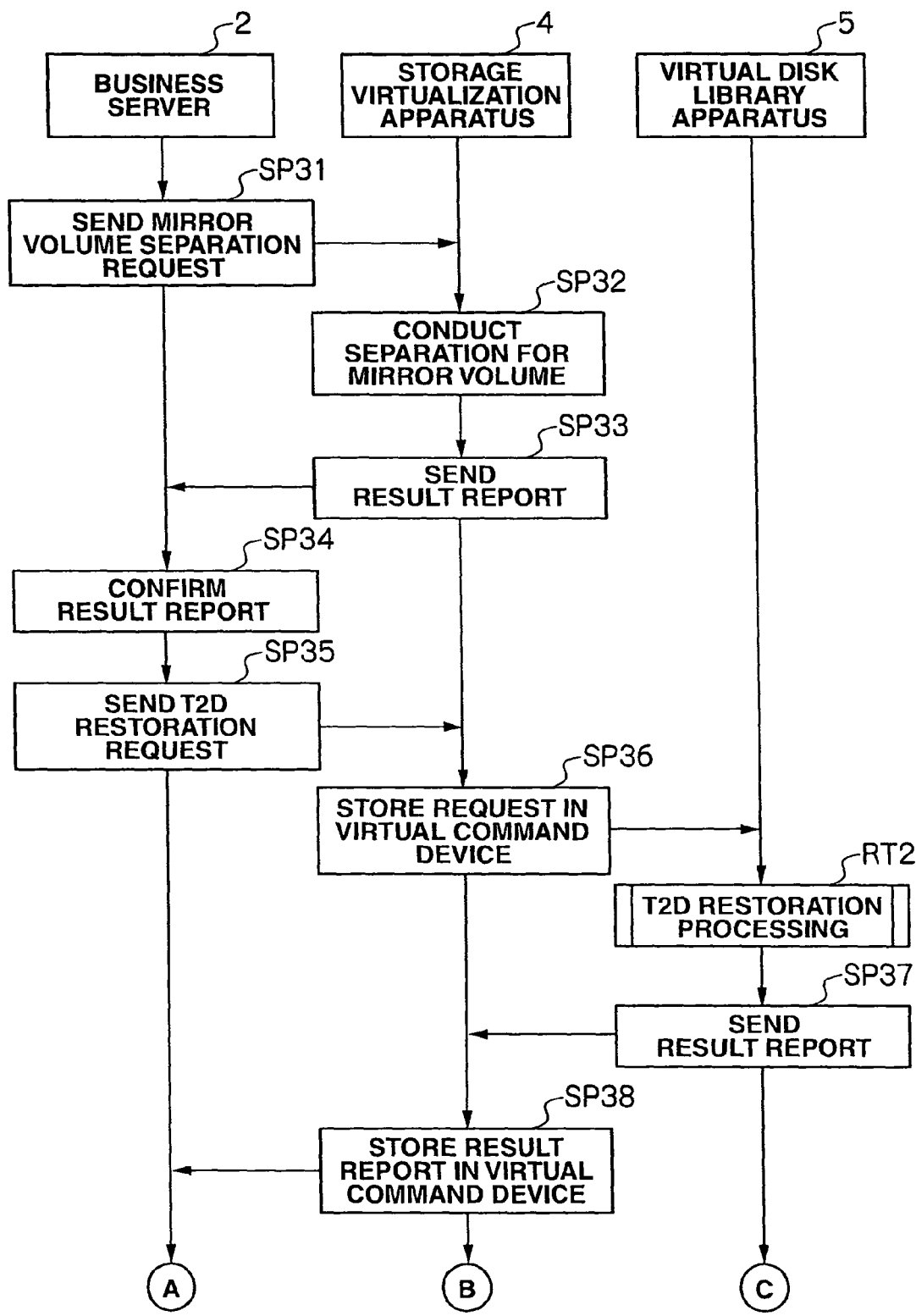
FIG. 10 is a flowchart illustrating a flow of restoration processing.
Figure 11:
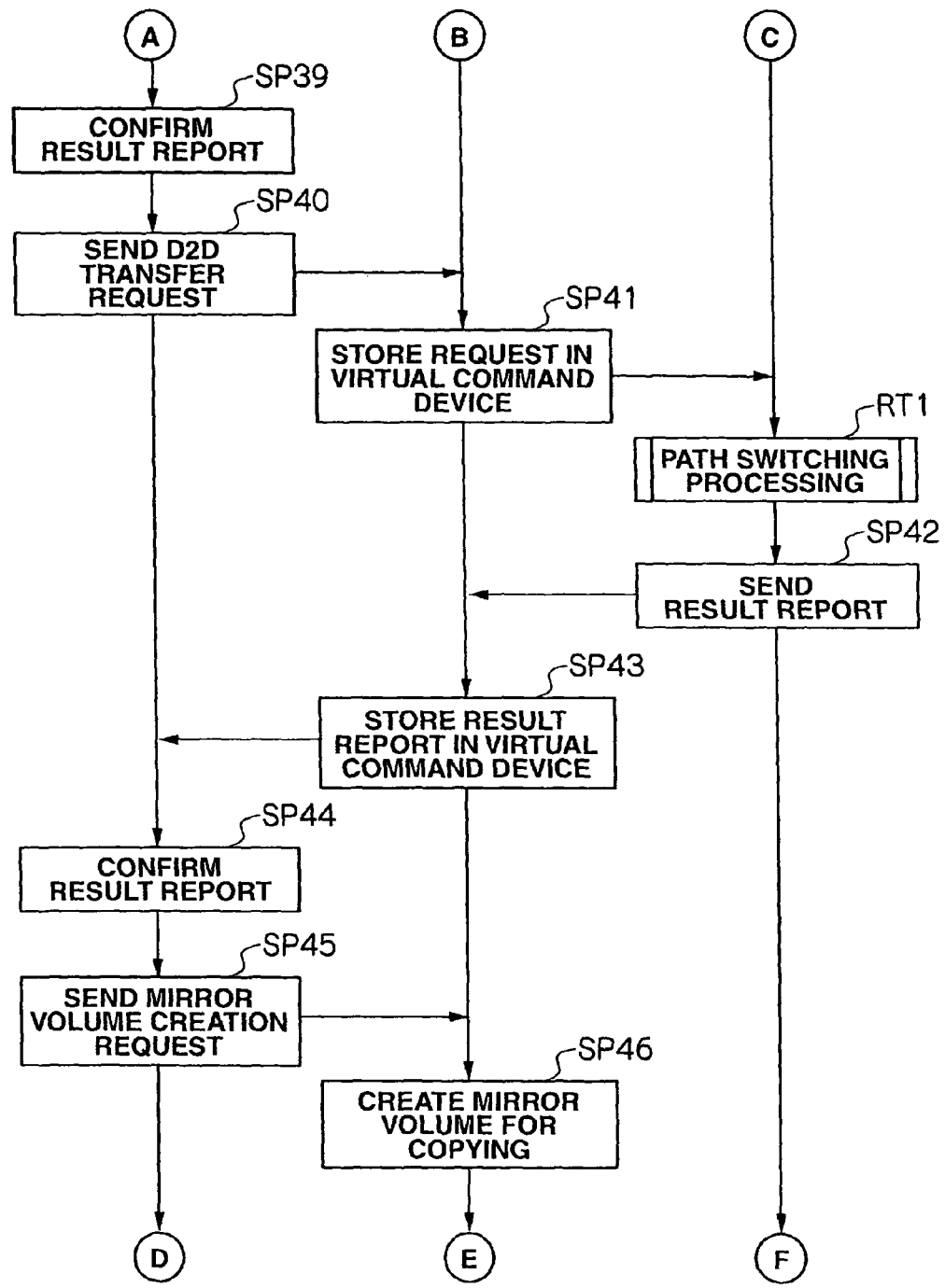
FIG. 11 is a flowchart illustrating a flow of restoration processing.
Figure 12:
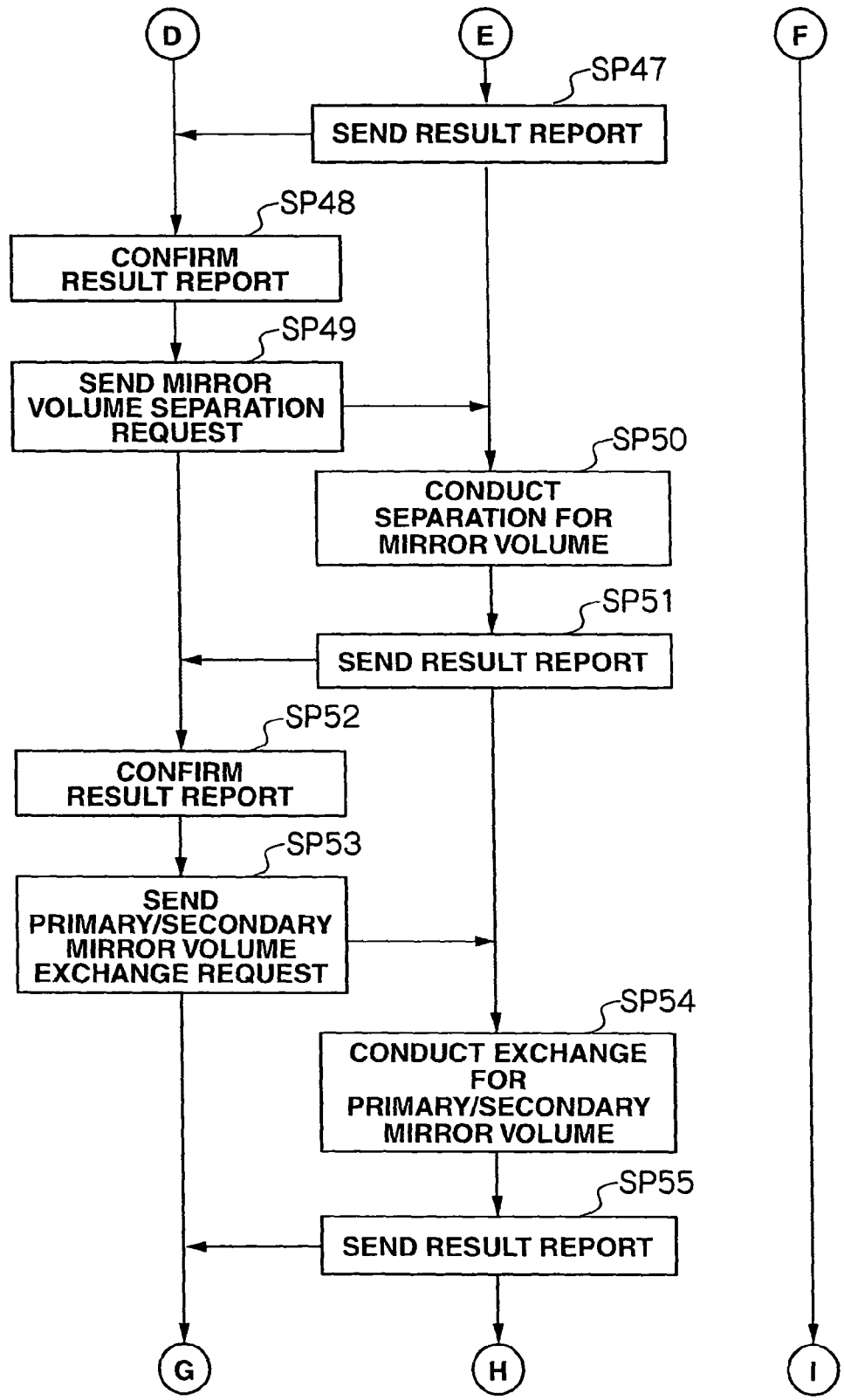
FIG. 12 is a flowchart illustrating a flow of restoration processing.
Figure 13:
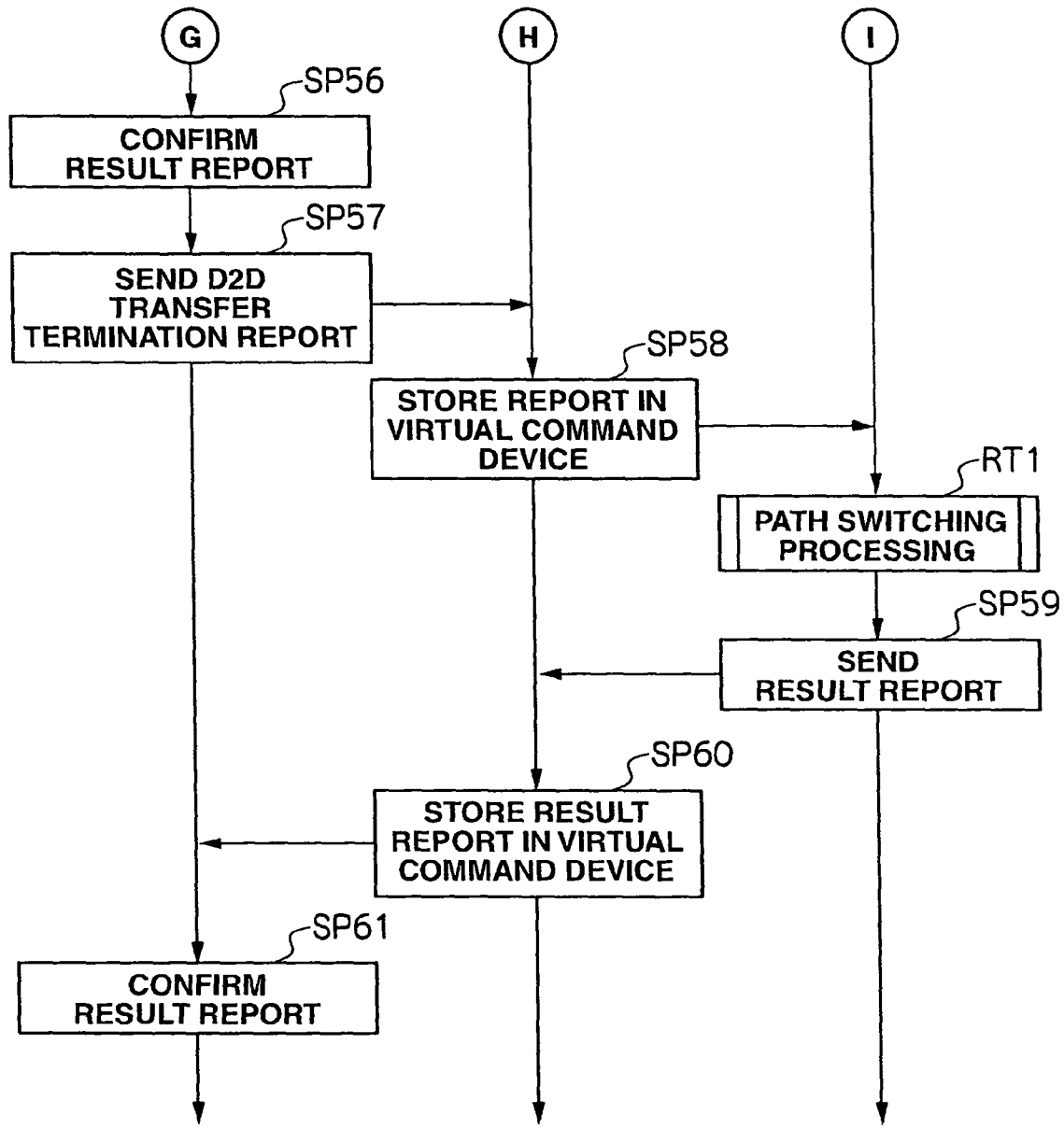
FIG. 13 is a flowchart illustrating a flow of restoration processing.

FIGS. 7 to 9 show an example of a flowchart of a specific procedure for processing executed by the CPU 11 of the business server 2, the CPU 41 of the controller unit 31 in the storage virtualization apparatus 4, and the CPU 81 of the controller unit 71 in the virtual disk library apparatus 5 regarding backup processing for the primary volume 61 in the storage system 1.

The CPU 11 of the business server 2 executes the path switching control program 23, either in response to an administrator of the business server 2's manipulations or at a predetermined time, thereby sending a D2D transfer request to the virtual command device 64 in the storage virtualization apparatus 4 (SP1).

Then the CPU 41 of the controller unit 31 in the storage virtualization apparatus 4 (hereinafter referred to as the CPU 41 in the storage virtualization apparatus 4) stores the D2D transfer request in the virtual command device 64 (in reality, the CPU 41 sends the D2D transfer request to the actual command device 102 in the virtual disk library apparatus 5) (SP2).

Subsequently, the CPU 81 of the controller unit 71 in the virtual disk library apparatus 5 (hereinafter referred to as the CPU 81 in the virtual disk library apparatus 5) executes path switching processing by executing the path switching processing program 92 according to the D2D transfer request stored in the actual command device 102 (RT1) (described later).

For example, where the host path 121 specified according to the D2D transfer request is executing transfer of replicated data according to a request for execution of backup processing (D2T backup) by transferring the replicated data from the secondary volume 101 to the tape 113, the CPU 81 in the virtual disk library apparatus 5 conducts switching to have the free host path 121 conduct the replicated data transfer according to the D2T backup request, and then conduct switching to change the host path 121 specified according to the D2D transfer request into the host path for transfer (with the business server 2) for the replicated data transfer according to the D2D transfer request.

Subsequently, the CPU 81 in the virtual disk library apparatus 5 sends a result report for the D2D transfer request, which is a report on, for example, the completion of the path switching processing, to the virtual command device 64 in the storage virtualization apparatus 4 (in reality, the CPU 81 stores the result report for the D2D transfer request in the actual command device 102 in the virtual disk library apparatus 5) (SP3).

Then the CPU 41 in the storage virtualization apparatus 4 stores the result report for the D2D transfer request in the virtual command device 64, and then sends the result report for the D2D transfer request to the business server 2 (in reality, the CPU 41 always monitors the actual command device 102 in the virtual disk library apparatus 5. When the result report for the D2D transfer request is stored in the actual command device 102, the CPU 41 retrieves the result report for the D2D transfer request and sends it to the business server 2) (SP4).

Next, the CPU 11 in the server 2 receives and confirms the result report for the D2D transfer request (SP5).

Subsequently, when confirming the completion of the path switching processing according to, e.g., the result report for the D2D transfer request, the CPU 11 in the business server 2 executes the mirror volume control program 21, thereby sending a mirror volume re-synchronization request to the command device 63 in the storage virtualization apparatus 4 (SP6).

Then the CPU 41 in the storage virtualization apparatus 4 executes mirror volume re-synchronization processing by executing the mirror volume processing program 51 according to the mirror volume re-synchronization request stored in the command device 63.

More specifically, the CPU 41 in the storage virtualization apparatus 4 re-synchronizes the primary volume 61 specified according to the mirror volume re-synchronization request with the virtual secondary volume 62, which is a mirror volume corresponding to the primary volume 61, and sends replicated data for the primary volume 61 to the virtual secondary volume 62 (in reality, sends the replicated data to the secondary volume 101 via the host path 121 (D2D transfer)), thereby performing backup via mirroring for the data for the primary volume 61 (SP7).

Subsequently, the CPU 41 in the storage virtualization apparatus 4 sends a result report for the mirror volume re-synchronization request, which is a report on, for example, the completion of mirror volume re-synchronization processing and the completion of mirroring between the primary volume 61 and the virtual secondary volume 62, to the business server 2 (SP8).

Next, the CPU 11 in the server 2 receives and confirms the result report for the mirror volume re-synchronization request (SP9).

Then, when confirming the completion of mirror volume re-synchronization processing according to, e.g., the result report for the mirror volume re-synchronization request, the CPU 11 in the business server 2 executes the mirror volume control program 21, thereby sending a mirror volume separation request to the command device 63 in the storage virtualization apparatus 4 (SP10).

Then the CPU 41 in the storage virtualization apparatus 4 executes mirror volume separation processing by executing the mirror volume processing program 51 according to the mirror volume separation request stored in the command device 63.

More specifically, the CPU 41 in the storage virtualization apparatus 4 separates the primary volume 61 specified according to the mirror volume separation request and the virtual secondary volume 62, which is a mirror volume corresponding to the primary volume 61, which are in a re-synchronization relationship, and terminates the mirroring for the data for the primary volume 61. Accordingly, the CPU 41 terminates backup processing (SP11).

Subsequently, the CPU 41 in the storage virtualization apparatus 4 sends a result report for the mirror volume separation request, which is a report on, for example, the completion of mirror volume separation processing and the completion of backup between the primary volume 61 and the virtual secondary volume 62, to the business server 2 (SP12).

Next, the CPU 11 in the server 2 receives and confirms the result report for the mirror volume separation request (SP13).

Then, when confirming the completion of mirror volume separation processing according to, e.g., the result report for the mirror volume separation request, the CPU 11 in the business server 2 executes the path switching control program 23, thereby sending a D2D transfer termination report, which is a report on the termination of D2D transfer, to the virtual command device 64 in the storage virtualization apparatus 4 (SP14).

Then the CPU 41 in the storage virtualization apparatus 4 stores the D2D transfer termination report in the virtual command device 64 (in reality, the CPU 41 sends the D2D transfer termination report to the actual command device 102 in the virtual disk library apparatus 5) (SP15).

Subsequently, the CPU 81 in the virtual disk library apparatus 5 executes path switching processing by executing the path switching processing program 92 according to the D2D transfer termination report stored in the actual command device 102 (RT1) (this will be described later).

For example, the CPU 81 in the virtual disk library apparatus 5 is adapted to conduct switching from the host path 121 specified according to the D2D transfer request to the host path 121 for transfer (with the tape library apparatus 74) for the replicated data transfer according to the D2T backup request and to re-adjust the load balance among the host paths 121 where the replicated data transfer is being executed according to another D2T backup request.

Next, the CPU 81 in the virtual disk library apparatus 5 sends a result report for the D2D transfer termination report, which is a report on, for example, the termination of path switching processing, to the virtual command device 64 in the storage virtualization apparatus 4 (in reality, the CPU 81 stores the result report for the D2D transfer termination report in the actual command device 102 in the virtual disk library apparatus 5) (SP16).

Then the CPU 41 in the storage virtualization apparatus 4 stores the result report for the D2D transfer termination report in the virtual command device 64, and then sends the result report to the business server 2 (in reality, when the result report for the D2D transfer termination report is stored in the actual command device 102, the CPU 41 reads out and sends the result report for the D2D transfer termination report to the business server 2) (SP17).

Next, the CPU 11 in the server 2 receives and confirms the result report for the D2D transfer termination report (SP18).

Then, when confirming the completion of path switching processing according to, e.g., the result report for the D2D transfer termination report, the CPU 11 in the business server 2 executes the backup/restoration control program 22, thereby sending the D2T backup request to the virtual command device 64 in the storage virtualization apparatus 4 (SP19).

Subsequently, the CPU 41 in the storage virtualization apparatus 4 stores the D2T backup report in the virtual command device 64 (in reality, the CPU 41 sends the D2T backup request to the actual command device 102 in the virtual disk library apparatus 5) (SP20).

Then the CPU 81 in the virtual disk library apparatus 5 executes D2T backup processing by executing the backup/restoration processing program 91 according to the D2T backup request stored in the actual command device 102 (RT2) (this will be described later).

For example, the CPU 81 in the virtual disk library apparatus 5 is adapted to transfer replicated data from the secondary volume 101 to the tape 113 via the host path 121 selected by transfer path selection processing (RT3) (described later), to thereby execute backup processing on the data for the secondary volume 101.

Next, the CPU 81 in the virtual disk library apparatus 5 sends a result report for the D2T backup request, which is a report on, for example, the completion of D2T backup processing, to the virtual command device 64 in the storage virtualization apparatus 4 (in reality, the CPU 81 stores the result report for the D2T backup request in the actual command device 102 in the virtual disk library apparatus 5) (SP21).

Then the CPU 41 in the storage virtualization apparatus 4 stores the result report for the D2T backup report in the virtual command device 64, and then sends the result report to the business server 2 (in reality, when the result report for the D2T backup report is stored in the actual command device 102, the CPU 41 reads out and sends the result report for the D2T backup report to the business server 2) (SP22).

Next, the CPU 11 in the server 2 receives and confirms the result report for the D2T backup report (SP23).

The backup processing for the primary volume 61 is executed in the storage system 1 in the manner described above.

Incidentally, the same primary volume 16 is specified for the D2D transfer request, mirror volume re-synchronization request, and mirror volume separation request.

(4-2) Flow of Restoration Processing

Next, the flow of restoration processing in accordance with the various programs in the storage system 1 in this embodiment will be described.

FIGS. 10 to 13 show an example of a flowchart for a specific procedure for processing executed by the CPU 11 of the business server 2, the CPU 41 of the controller unit 31 in the storage virtualization apparatus 4, and the CPU 81 of the controller unit 71 in the virtual disk library apparatus 5, for restoration processing for the primary volume 61 in the storage system 1.

The CPU 11 of the business server 2 executes the mirror volume control program 23, for example, either in response to an administrator of the business server 2's manipulations or when a failure occurs, thereby sending a mirror volume separation request to the command device 63 in the storage virtualization apparatus 4 (SP31).

Then the CPU 41 in the storage virtualization apparatus 4 executes mirror volume separation processing by executing the mirror volume processing program 51 according to the mirror volume separation request stored in the command device 63.

More specifically, where the primary volume 61 specified according to the mirror volume separation request has been synchronized with the virtual secondary volume 62, which is a mirror volume corresponding to the primary volume 61, the CPU 41 in the storage virtualization apparatus 4 separates synchronization between the primary volume 61 and the virtual secondary volume 62, and terminates the mirroring for the data for the primary volume 61. Accordingly, the CPU 41 terminates backup processing (SP32).

Subsequently, the CPU 41 in the storage virtualization apparatus 4 sends a result report for the mirror volume separation request, which is a report on, for example, the completion of mirror volume separation processing and the completion of backup between the primary volume 61 and the virtual secondary volume 62, to the business server 2 (SP33). Note that where the primary volume 61 has not been synchronized with the virtual secondary volume 62, the CPU 41 reports that to the business server 2.

Next, the CPU 11 in the server 2 receives and confirms the result report for the mirror volume separation request (SP34).

Then, when confirming the completion of mirror volume separation processing according to, e.g., the result report for the mirror volume separation report or confirming that the primary volume 61 has not been synchronized with the virtual secondary volume 62, the CPU 11 in the business server 2 executes the backup/restoration control program 22, thereby sending a request for execution of restoration processing by transferring replicated data stored in the tape 113 to the secondary volume 101 (virtual secondary volume 62) corresponding to the specified primary volume 61 (T2D restoration) (hereinafter referred to as "T2D restoration request") to the virtual command device 64 in the storage virtualization apparatus 4 (SP35).

Subsequently, the CPU 41 in the storage virtualization apparatus 4 stores the T2D restoration request in the virtual command device 64 (in reality, the CPU 41 sends the T2D restoration request to the actual command device 102 in the virtual disk library apparatus 5) (SP36).

Then the CPU 81 in the virtual disk library apparatus 5 executes T2D restoration processing by executing the backup/restoration processing program 91 according to the T2D restoration request stored in the actual command device 102 (RT2) (this will be described later).

For example, the CPU 81 in the virtual disk library apparatus 5 is adapted to transfer replicated data stored in the tape 113 to the secondary volume 101 (virtual secondary volume 62) corresponding to the primary volume 61 specified according to the T2D restoration request via the host path 121 selected by transfer path selection processing (RT3) (described later), to thereby execute restoration processing on the data for the secondary volume 101.

Next, the CPU 81 in the virtual disk library apparatus 5 sends a result report for the T2D restoration request, which is a report on, for example, the completion of T2D restoration processing, to the virtual command device 64 in the storage virtualization apparatus 4 (in reality, the CPU 81 stores the result report for the T2D restoration request in the actual command device 102 in the virtual disk library apparatus 5) (SP37).

Then the CPU 41 in the storage virtualization apparatus 4 stores the result report for the T2D restoration request in the virtual command device 64, and then sends the result report to the business server 2 (in reality, when the result report for the T2D restoration request is stored in the actual command device 102, the CPU 41 reads out and sends the result report to the business server 2) (SP38).

Next, the CPU 11 in the business server 2 receives and confirms the result report for the T2D restoration request (SP39).

Then, when confirming the completion of T2D restoration processing according to, e.g., the result report for the T2D restoration request, the CPU 11 in the business server 2 executes the path switching control program 23, thereby sending a D2D transfer request to the virtual command device 64 in the storage virtualization apparatus 4 (SP40).

Subsequently, the CPU 41 in the storage virtualization apparatus 4 stores the D2D transfer request in the virtual command device 64 (in reality, the CPU 41 sends the D2D transfer request to the actual command device 102 in the virtual disk library apparatus 5) (SP41).

Then the CPU 81 in the virtual disk library apparatus 5 executes path switching processing by executing the path switching processing program 92 according to the D2D transfer request stored in the actual command device 102 (RT1) (this will be described later).

For example, where the host path 121 specified according to the D2D transfer request is executing a transfer of replicated data according to a D2T backup request, the CPU 81 in the virtual disk library apparatus 5 conducts switching to have the free host path 121 conduct the replicated data transfer according to the D2T backup request, and then conduct switching to change the host path 121 specified according to the D2D transfer request into the host path for transfer (with the business server 2) for the replicated data transfer according to the D2D transfer request.

Next, the CPU 81 in the virtual disk library apparatus 5 sends a result report for the D2D transfer request, which is a report on, for example, the completion of path switching processing, to the virtual command device 64 in the storage virtualization apparatus 4 (in reality, the CPU 81 stores the result report for the D2D transfer request in the actual command device 102 in the virtual disk library apparatus 5) (SP42).

Then the CPU 41 in the storage virtualization apparatus 4 stores the result report for the D2D transfer request in the virtual command device 64, and then sends the result report to the business server 2 (in reality, when the result report for the D2D transfer request is stored in the actual command device 102, the CPU 41 reads out and sends the result report for the D2D transfer request to the business server 2) (SP43).

Next, the CPU 11 in the business server 2 receives and confirms the result report for the D2D transfer request (SP44).

Then, when confirming the completion of path switching processing according to, e.g., the result report for the D2D transfer request, the CPU 11 in the business server 2 executes the mirror volume control program 21, thereby sending a mirror volume creation request to the command device 63 in the storage virtualization apparatus 4 (SP45).

Subsequently, the CPU 41 in the storage virtualization apparatus 4 executes mirror volume creation processing by executing the mirror volume processing program 51 according to the mirror volume creation request stored in the command device 63.

More specifically, the CPU 41 in the storage virtualization apparatus 4 creates a new virtual secondary volume 62, which is a mirror volume corresponding to the primary volume 61 specified according to the mirror volume creation request, synchronizes the primary volume 61 with the newly created virtual secondary volume 62, and sends replicated data for the primary volume 61 to the virtual secondary volume 62 (in reality, sends the replicated data to the secondary volume 101 via the host path 121 (D2D transfer)), thereby performing copying via mirroring for the data for the primary volume 61 (SP46).

Then the CPU 41 in the storage virtualization apparatus 4 sends a result report for the mirror volume creation request, which is a report on, for example, the creation of the new virtual secondary volume 62 as a result of the completion of mirror volume creation processing and the completion of mirroring between the primary volume 61 and the virtual secondary volume 62, to the business server 2 (SP47).

Next, the CPU 11 in the business server 2 receives and confirms the result report for the mirror volume creation request (SP48).

Then, when confirming the completion of mirror volume creation processing according to, e.g., the result report for the mirror volume creation request, the CPU 11 in the business server 2 executes the mirror volume control program 21, thereby sending a mirror volume separation request to the command device 63 in the storage virtualization apparatus 4 (SP49).

Subsequently, the CPU 41 in the storage virtualization apparatus 4 executes mirror volume separation processing by executing the mirror volume processing program 51 according to the mirror volume separation request stored in the command device 63.

More specifically, the CPU 41 in the storage virtualization apparatus 4 separates synchronization between the primary volume 61, which is specified according to the mirror volume separation request, and the virtual secondary volume 62, which has been newly created in correspondence with the primary volume 61, and terminates the mirroring for the data for the primary volume 61. As a result, the CPU 41 terminates copying (SP50).

Then the CPU 41 in the storage virtualization apparatus 4 sends a result report for the mirror volume separation request, which is a report on, for example, the completion of mirror volume separation processing and the termination of copying between the primary volume 61 and the newly created virtual secondary volume 62, to the business server 2 (SP51).

Next, the CPU 11 in the business server 2 receives and confirms the result report for the mirror volume separation request (SP52).

Then, when confirming the completion of mirror volume separation processing according to, e.g., the result report for the mirror volume separation request, the CPU 11 in the business server 2 executes the mirror volume control program 21, thereby sending a primary/secondary mirror volume exchange request to the command device 63 in the storage virtualization apparatus 4 (SP53).

Subsequently, the CPU 41 in the storage virtualization apparatus 4 executes primary/secondary mirror volume exchange processing by executing the mirror volume processing program 51 according to a primary/secondary mirror volume exchange request stored in the command device 63.

More specifically, the CPU 41 in the storage virtualization apparatus 4 exchanges data between the primary volume 61, which is specified according to the primary/secondary mirror volume exchange request, and the virtual secondary volume 62, which is a mirror volume corresponding to the primary volume 61 (SP54).

In reality, the CPU 41 in the storage virtualization apparatus 4 sends the replicated data for the secondary volume 101, which has been stored in and is transferred from the tape 113 by executing T2D restoration processing according to the T2D restoration request, to the primary volume 61 via the host path 121 (D2D transfer), thereby performing copy to the primary volume 61 for restoration for the primary volume 61.

Then the CPU 41 in the storage virtualization apparatus 4 sends a result report for the primary/secondary mirror volume exchange request, which is a report on, for example, the completion of primary/secondary mirror volume exchange processing and the completion of restoration for the primary volume 61, to the business server 2 (SP55).

Next, the CPU 11 in the business server 2 receives and confirms the result report for the primary/secondary mirror volume exchange request (SP56).

Then, when confirming the completion of primary/secondary mirror volume exchange processing according to, e.g., the result report for the primary/secondary mirror volume exchange request, the CPU 11 in the business server 2 executes the path switching control program 23, thereby sending a D2D transfer termination report, which is a report on the termination of D2D transfer, to the virtual command device 64 in the storage virtualization apparatus 4 (SP57).

Subsequently, the CPU 41 in the storage virtualization apparatus 4 stores the D2D transfer termination report in the virtual command device 64 (in reality, the CPU 41 sends the D2D transfer termination report to the actual command device 102 in the virtual disk library apparatus 5) (SP58).

Subsequently, the CPU 81 in the virtual disk library apparatus 5 executes path switching processing by executing the path switching processing program 92 according to the D2D transfer termination report stored in the actual command device 102 (RT1) (this will be described later).

For example, the CPU 81 in the virtual disk library apparatus 5 is adapted to conduct switching to change the host path 121 specified according to the D2D transfer request into the host path 121 for transfer (with the tape library apparatus 74) for the replicated data transfer according to the D2T backup request and to re-adjust the load balance among the host paths 121 where the replicated data transfer is being executed according to the D2T backup request.

Next, the CPU 81 in the virtual disk library apparatus 5 sends a result report for the D2D transfer termination report, which is a report on, for example, the completion of path switching processing, to the virtual command device 64 in the storage virtualization apparatus 4 (in reality, the CPU 81 stores the result report for the D2D transfer termination report in the actual command device 102 in the virtual disk library apparatus 5) (SP59).

Then the CPU 41 in the storage virtualization apparatus 4 stores the result report for the D2D transfer termination report in the virtual command device 64, and then sends the result report to the business server 2 (in reality, when the result report for the D2D transfer termination report is stored in the actual command device 102, the CPU 41 reads out and sends the result report for the D2D transfer termination report to the business server 2) (SP60).

Next, the CPU 11 in the server 2 receives and confirms the result report for the D2D transfer termination report (SP61).

The restoration processing for the primary volume 61 is executed in the storage system 1 in the manner described above.

Incidentally, the same primary volume 16 is specified for the mirror volume separation request, D2D transfer request, mirror volume creation request, and primary-secondary mirror volume exchange request.

(4-3) Path Switching Processing

Next, path switching processing in accordance with the path switching processing program 92 in the storage system 1 in this embodiment will be described.

Figure 14:
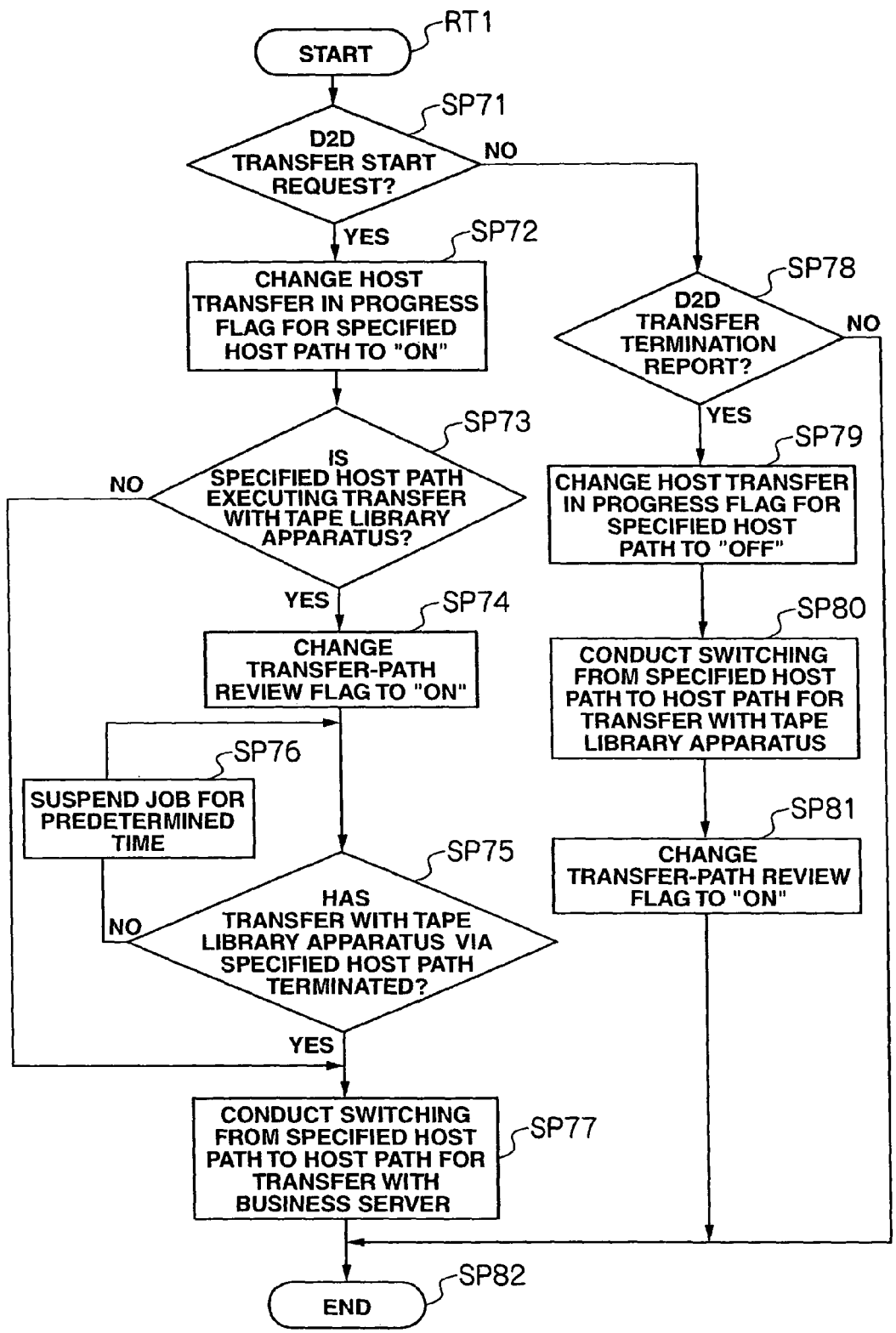
FIG. 14 is a flowchart illustrating a procedure for path switching processing.

FIG. 14 shows an example of a flowchart of a specific procedure for processing executed by the CPU 81 in the virtual disk library apparatus 5 regarding path switching processing for the virtual disk library apparatus 5 in the storage system 1.

When receiving various requests including a D2D transfer request from the business server 2 via the storage virtualization apparatus 4, the CPU 81 in the virtual disk library apparatus 5 executes the path switching processing program 92, thereby checking if the request, which the CPU 81 has received from the business server 2 via the storage virtualization apparatus 4, is a D2D transfer request in accordance with the procedure RT1 for path switching processing shown in FIG. 14 (SP71).

Then, if the request is a D2D transfer request (SP71:YES), the CPU 81 in the virtual disk library apparatus 5 refers to the host-path number management column 93A and the host transfer in progress flag column 93C in the path transfer control table 93, and changes "0" to "1" ("off" to "on") for the host transfer in progress flag corresponding to the host path number for the host path 121 specified according to the D2D transfer request (SP72).

Subsequently, the CPU 81 in the virtual disk library apparatus 5 checks if the host path 121 specified according to the D2D transfer request is executing a transfer with the tape library apparatus 74 (SP73).

More specifically, the CPU 81 in the virtual disk library apparatus 5 refers to the column 93D for the number of tape transfer jobs in the path transfer control table 93, and checks if the number of tape transfer jobs for the host path number for the host path 121 specified according to the D2D transfer request is "0."

Then, if the host path 121 is not executing a transfer with the tape library apparatus 74, i.e., if the number of tape transfer jobs is "0" (SP73: NO), the CPU 81 in the virtual disk library apparatus 5 proceeds to step SP77.

On the other hand, if the host path 121 is executing a transfer with the tape library apparatus 74, i.e., if the number of tape transfer jobs is not "0" (SP73:YES), the CPU 81 in the virtual disk library apparatus 5 refers to the transfer-path review flag column 94E in the job control table 94, and changes "off" to "on" ("0" to "1") for the transfer-path review flag for the job number for the job counted for the number of tape transfer jobs in the column 93D for the number of tape transfer jobs in the path transfer control table 93, thereby conducting switching to have the free host path 121 conduct the replicated data transfer according to the D2T backup request (SP74).

Next, the CPU 81 in the virtual disk library apparatus 5 checks if the host path 121 specified according to the D2D transfer request has terminated the transfer with the tape library apparatus 74 (SP75).

Specifically, the CPU 81 in the virtual disk library apparatus 5 refers to the column 93D for the number of tape transfer jobs in the path transfer control table 93, and checks if the number of tape transfer jobs corresponding to the host path number for the host path 121 specified according to the D2D transfer request is "0."

If the host path 121 has not terminated the transfer with the tape library apparatus 74, i.e., if the number of tape transfer jobs is not "0" (SP75: NO), the CPU 81 in the virtual disk library apparatus 5 refers to the job status column 94C in the job control table 94, changes "in progress" to "waiting" for the job corresponding to the D2D transfer request, suspends the job for a predetermined time, and waits for the termination of the transfer with the tape library apparatus 74 (SP76), and then refers to the job status column 94C in the job control table 94 again, changes "waiting" to "in progress" for the job corresponding to the D2D transfer request, and checks if the host path 121 specified according to the D2D transfer request has terminated the transfer with the tape library apparatus 74 again (SP75).

On the other hand, if the host path 121 has terminated the transfer with the tape library apparatus 74, i.e., if the number of tape transfer jobs is "0" (SP75: YES) or if the host path 121 is not executing the transfer with the tape library apparatus 74, i.e., if the number of tape transfer jobs is "0" (SP73: NO), the CPU 81 in the virtual disk library apparatus 5 conduct switching to change the host path 121 specified according to the D2D transfer request into the host path 121 for transfer with the business server 2 (SP77).

On the other hand, if the request the CPU 81 received from the business server 2 via the storage virtualization apparatus 4, is not a D2D transfer request (SP71: NO), the CPU 81 in the virtual disk library apparatus 5 checks if the request is a D2D transfer termination report (SP78).

Then, if the request is not a D2D transfer termination report (SP78: NO), the CPU 81 in the virtual disk library apparatus 5 does not need to execute path switching processing, and therefore, terminates the procedure RT1 for path switching processing shown in FIG. 14 (SP82).

On the other hand, if the request is a D2D transfer termination report (SP78: YES), which means the termination of D2D transfer, the CPU 81 in the virtual disk library apparatus 5 refers to host path number management column 93A and the host transfer in progress flag column 93C in the path transfer control table 93, and changes "on" to "off" ("1" to "0") for the host transfer in progress flag corresponding to the host path number for the host path 121 specified according to the D2D transfer termination report (SP79).

Subsequently, the CPU 81 in the virtual disk library apparatus 5 conduct switching to change the host path 121 specified according to the D2D transfer termination report into the host path 121 for transfer with the tape library apparatus 74 (SP80).

Then, if the host path 121 is executing replicated-data transfer according to the D2T backup request or T2D restoration request, the CPU 81 in the virtual disk library apparatus 5 refers to the transfer-path review flag column 94E in the job control table 94, and changes "off" to "on" ("0" to "1") for the transfer-path review flag corresponding to the job number for the job for the D2T backup request or T2D restoration request (SP81).

After that, the CPU 81 in the virtual disk library apparatus 5 terminates the procedure RT1 for path switching processing shown in FIG. 14 (SP82).

(4-4) Backup/Restoration Processing

Next, backup/restoration processing in accordance with the path backup/restoration processing program 91 in the storage system 1 in this embodiment will be described.

Figure 15:
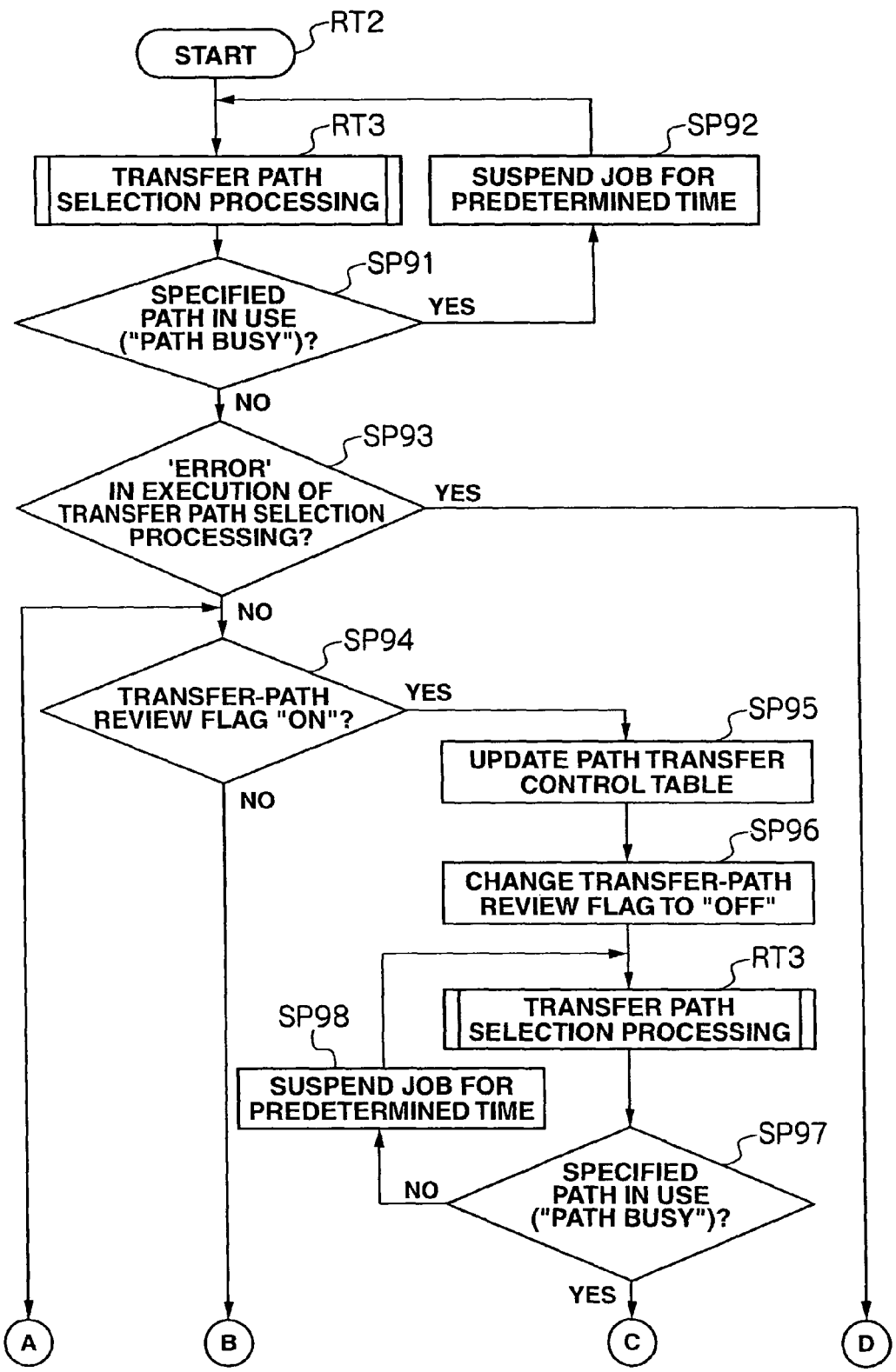
FIG. 15 is a flowchart illustrating a procedure for backup/restoration processing.
Figure 16:
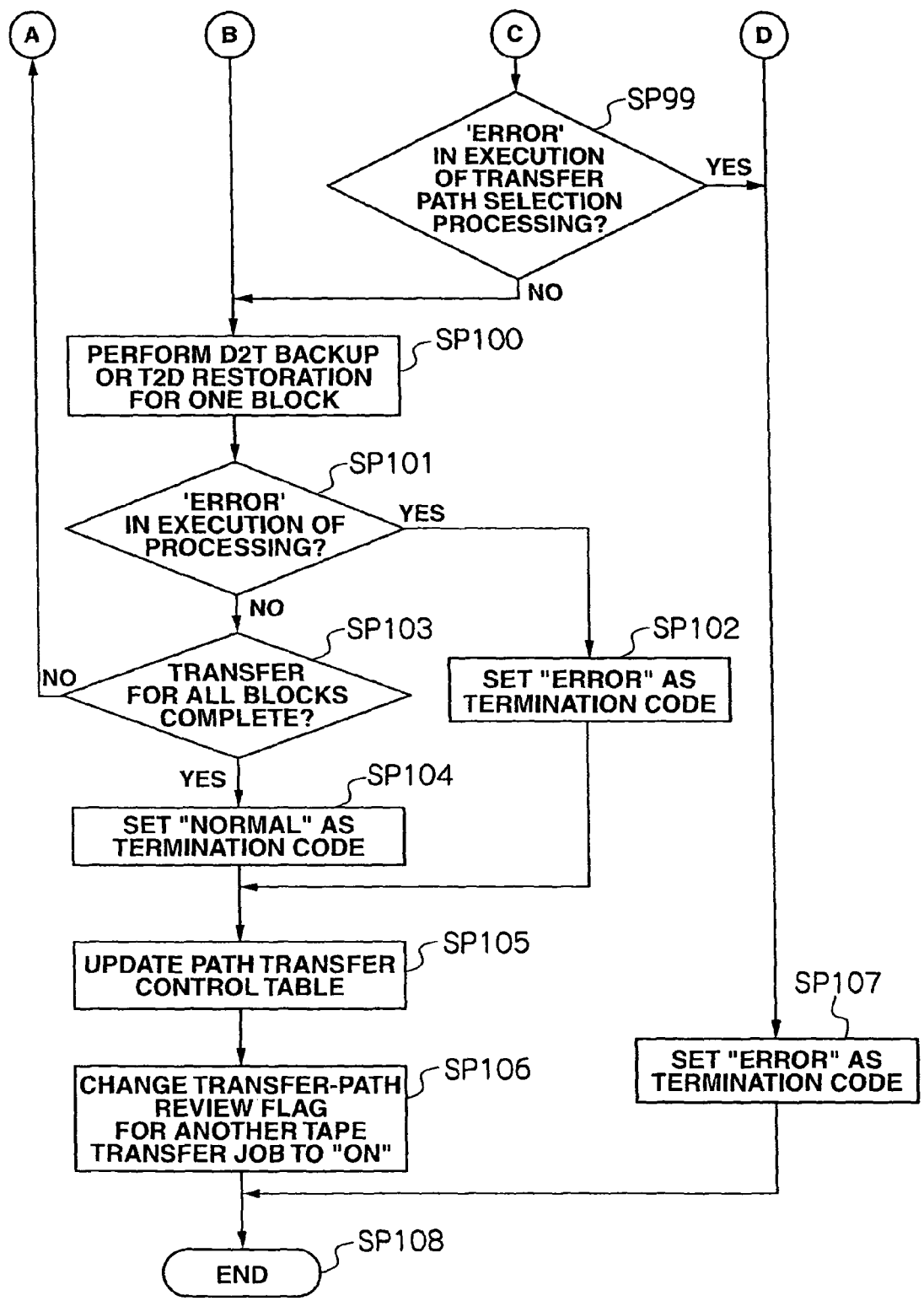
FIG. 16 is a flowchart illustrating a procedure for backup/restoration processing.

FIGS. 15 and 16 show an example of a flowchart showing a specific procedure for processing executed by the CPU 81 in the virtual disk library apparatus 5 regarding backup/restoration processing in the virtual disk library apparatus 5 in the storage system 1.

When receiving, for example, a D2T backup request or T2D restoration request from the business server 2 via the storage virtualization apparatus 4, the CPU 81 in the virtual disk library apparatus 5 executes the backup/restoration processing program 91, thereby executing transfer path selection processing for selecting the host path 121 for executing backup/restoration processing in accordance with the procedure RT2 for backup/restoration processing shown in FIGS. 15 and 16 (RT3) (this will be described later).

Next, the CPU 81 in the virtual disk library apparatus 5 checks if the host path 121 selected by transfer path selection processing is in use ("path busy") (SP91).

Then, if the host path 121 selected by transfer path selection processing is in use ("path busy") (SP91: YES), the CPU 81 in the virtual disk library apparatus 5 refers to the job status column 94C in the job control table 94, changes "in progress" to "waiting" for the job corresponding to the D2T backup request or T2D restoration request, suspends the job for a predetermined time, and waits for the host path 121 to terminate the transfer with the business server 2 or the tape library apparatus 74 (SP92), and again refers to the job status column 94C in the job control table 94, changes "waiting" to "in progress" for the job corresponding to the D2T backup request or T2D restoration request, to thereby execute transfer path selection processing (RT3) (this will be described later).

On the other hand, if the host path 121 selected by transfer path selection processing is not in use ("path busy") (SP91: NO), the CPU 81 in the virtual disk library apparatus 5 checks if there has been an 'error' in the execution of the transfer path selection processing (SP93).

Then, if there has not been an 'error' in the execution of transfer path selection processing (SP93: NO), the CPU 81 in the virtual disk library apparatus 5 refers to the transfer-path review flag column 94E in the job control table 94, and checks if the transfer-path review flag for the job corresponding to the D2T backup request or T2D restoration request is "on" ("1") (SP94).

If the transfer-path review flag for the job is not "on" ("1") (SP94: NO), the CPU 81 in the virtual disk library apparatus 5 proceeds to step SP100.

On the other hand, if the transfer-path review flag for the job is "on" ("1") (SP94: YES), the CPU 81 in the virtual disk library apparatus 5 updates the path transfer control table 93 (SP95).

Specifically, the host path 121 selected by transfer path selection processing has been specified according to the D2D transfer request, or the D2D transfer has terminated, the CPU 81 in the virtual disk library apparatus 5 refers to the column 93D for the number of tape transfer jobs in the path transfer control table 93, and reduces the number of tape transfer jobs for the job corresponding to the D2T backup request or T2D restoration request by "1."

Subsequently, the CPU 81 in the virtual disk library apparatus 5 changes "on" to "off" ("1" to "0") for the transfer-path review flag for the job corresponding to the D2T backup request or T2D restoration request (SP96).

Then the CPU 81 in the virtual disk library apparatus 5 executes transfer path selection processing to select a host path 121 again for execution of backup/restoration processing (RT3) (this will be described later).

Then the CPU 81 in the virtual disk library apparatus 5 checks if the host path 121 selected by transfer path selection processing is in use ("path busy") (SP97).

Next, if the host path 121 selected by transfer path selection processing is not in use ("path busy") (SP97: NO), the CPU 81 in the virtual disk library apparatus 5 refers to the job status column 94C in the job control table 94, changes "in progress" to "waiting" for the job corresponding to the D2T backup request or T2D restoration request, suspends the job for a predetermined time, and waits for the host path 121 to terminate the transfer with the business server 2 or the tape library apparatus 74 (SP98), and again refers to the job status column 94C in the job control table 94, changes "waiting" to "in progress" for the job corresponding to the D2T backup request or T2D restoration request, thereby executing transfer path selection processing (RT3) (this will be described later).

On the other hand, if the host path 121 selected by transfer path selection processing is in use ("path busy") (SP97: YES), the CPU 81 in the virtual disk library apparatus 5 checks if there has been an 'error' in the execution of transfer path selection processing (SP99).

Then, if there has not been an 'error' in the execution of transfer path selection processing (SP99: NO), or the transfer-path review flag for the job corresponding to the D2T backup request or T2D restoration request is not "on" ("1") (SP94: NO), the CPU 81 in the virtual disk library apparatus 5 performs D2T backup or T2D restoration for the replicated data for one block that is a predetermined unit for replicated-data storage (SP100).

Subsequently, the CPU 81 in the virtual disk library apparatus 5 checks if there has been an 'error' in the execution of D2Tbackup or T2D restoration (SP101).

Then, if there has been an 'error' in the execution of D2Tbackup or T2D restoration (SP101: YES), the CPU 81 in the virtual disk library apparatus 5 sets "error" as a termination code for backup/restoration processing (SP102), and then proceeds to step SP105.

On the other hand, if there has not been an 'error' in the execution of D2Tbackup or T2D restoration (SP101: NO), the CPU 81 in the virtual disk library apparatus 5 checks if D2T backup or T2D restoration has terminated for all blocks (SP103).

Then, if D2T backup or T2D restoration has not terminated for all blocks (SP103: NO), the CPU 81 in the virtual disk library apparatus 5 returns to step SP94, refers to the transfer-path review flag column 94E in the job control table 94, checks if the transfer-path review flag for the job corresponding to the D2T backup request or T2D restoration request is "on" ("1") (SP94), and then repeats the same processing as described for the above case (SP94 to SP103).

On the contrary, if D2T backup or T2D restoration has terminated for all blocks (SP103: YES), this indicates that backup/restoration processing has terminated normally, and therefore, the CPU 81 in the virtual disk library apparatus 5 sets "normal" as the termination code for backup/restoration processing (SP104).

Next, the CPU 81 in the virtual disk library apparatus 5 updates the path transfer control table 93 (SP105).

Specifically, since D2T backup or T2D restoration has terminated for all the blocks, the CPU 81 in the virtual disk library apparatus 5 refers to the column 93D for the number of tape transfer jobs in the path transfer control table 93, and reduces the number of tape transfer jobs for the job corresponding to the D2T backup request or T2D restoration request by "1."

Then, if the host path 121 is executing replicated-data transfer according to the D2T backup request or T2D restoration request, in order to re-adjust the load balance among the host paths 121, the CPU 81 in the virtual disk library apparatus 5 refers to the transfer-path review flag column 94E in the job control table 94, and changes "off" to "on" ("0" to "1") for the transfer-path review flag corresponding to the job number for the job for the D2T backup request or T2D restoration request (SP106).

After that, the CPU 81 in the virtual disk library apparatus 5 terminates the procedure RT2 for backup/restoration processing shown in FIGS. 15 and 16 (SP108).

Incidentally, if there has been an 'error' in the execution of transfer path selection processing (SP93, SP99: YES), the CPU 81 in the virtual disk library apparatus 5 sets "error" as the termination code for backup/restoration processing (SP102), and then terminates the procedure RT2 for backup/restoration processing shown in FIGS. 15 and 16 (SP108).

(4-5) Transfer Path Selection Processing

Next, transfer path selection processing in accordance with a transfer path selection processing program in the backup/restoration processing program in the storage system 1 in this embodiment will be described.

Figure 17:
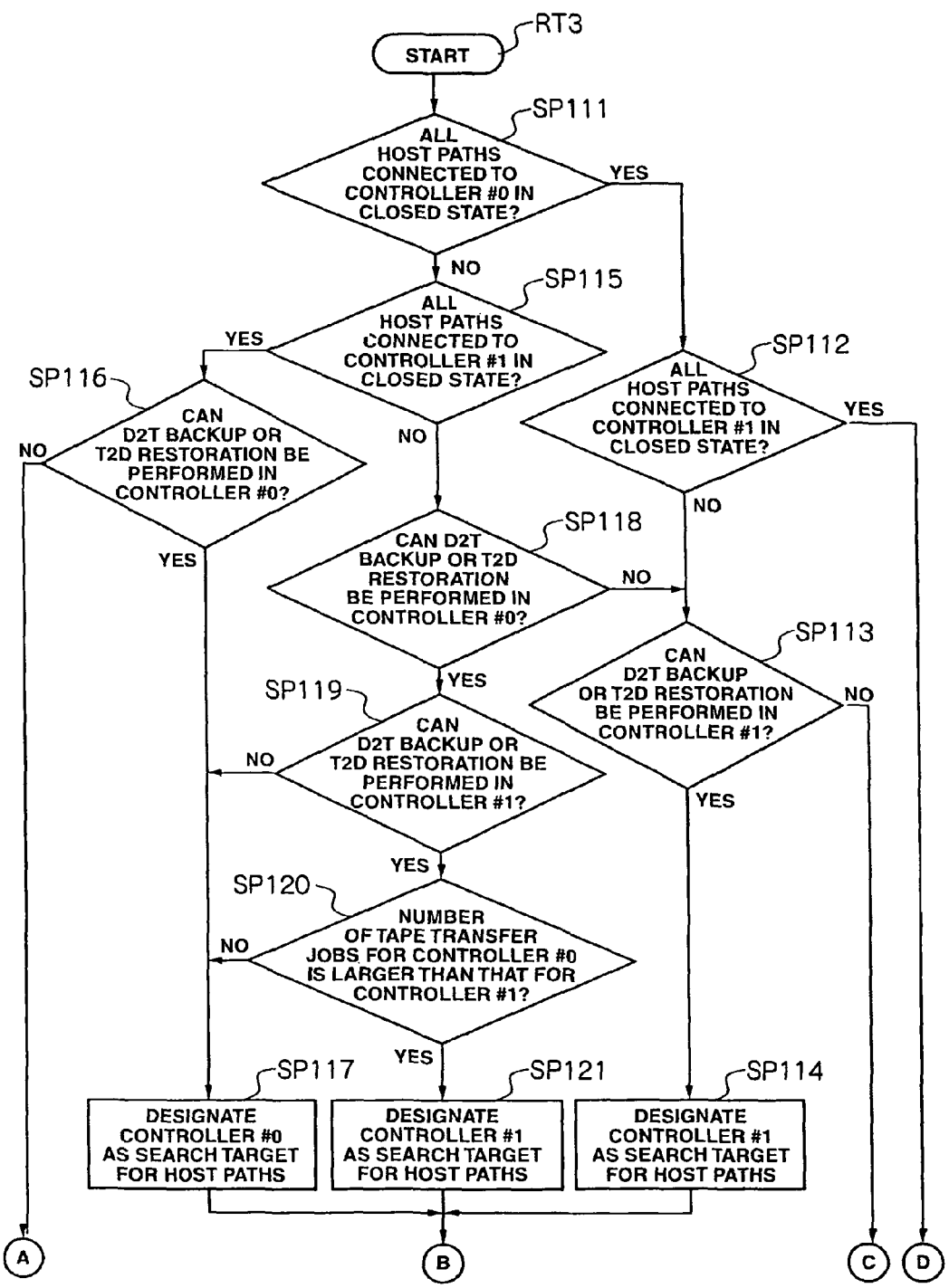
FIG. 17 is a flowchart illustrating a procedure for transfer path selection processing.
Figure 18:
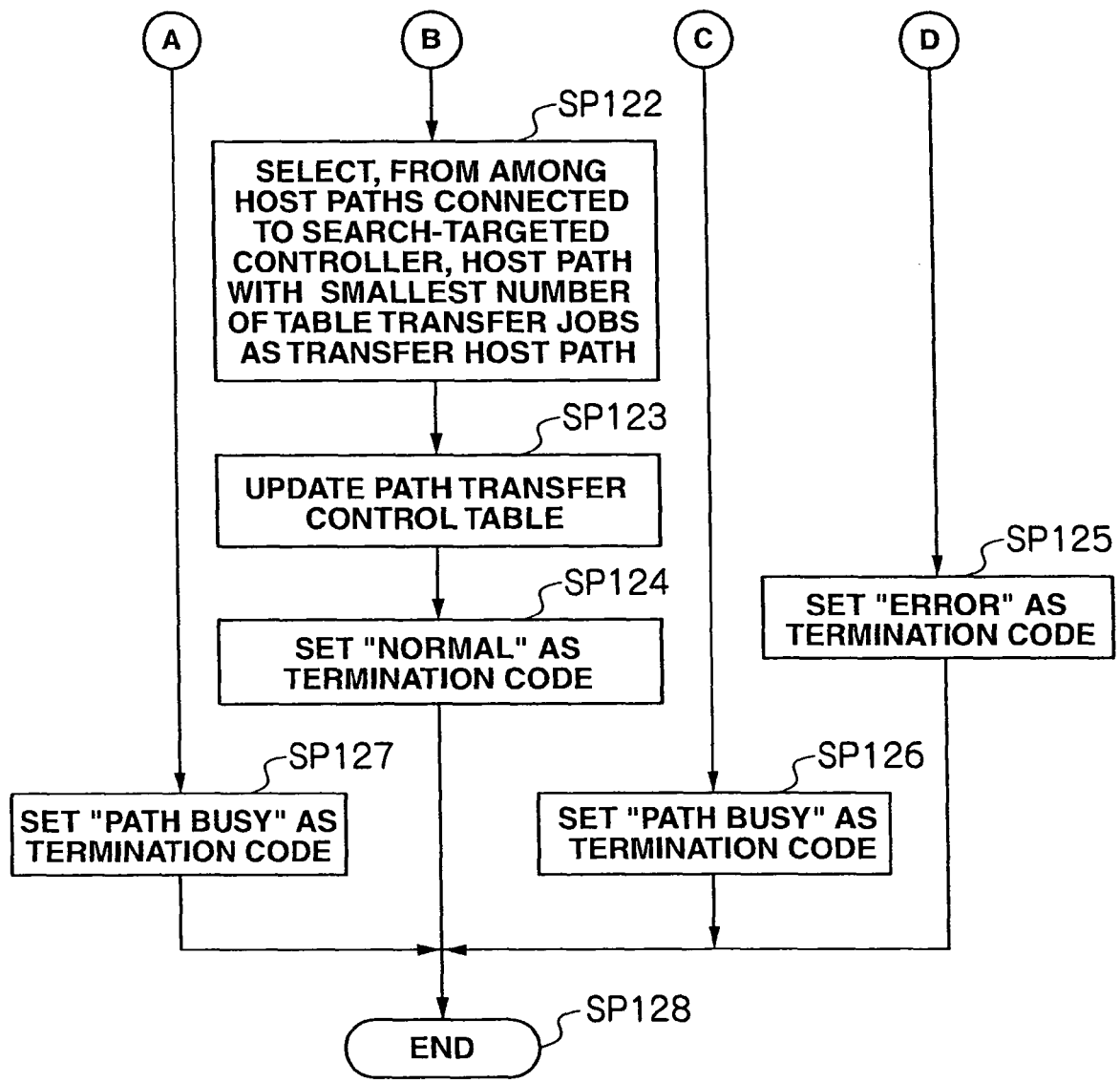
FIG. 18 is a flowchart illustrating a procedure for transfer path selection processing.

FIGS. 17 and 18 show an example of a flowchart of a specific procedure for processing executed by the CPU 81 in the virtual disk library apparatus 5 regarding transfer path selection processing in the virtual disk library apparatus 5 in the storage system 1.

When, for example, receiving a D2D backup request or T2D restoration request from the business server 2 via the storage virtualization apparatus 4, or changing "on" to "off" ("1" to "0") for the transfer-path review flag for the job corresponding to the D2T backup request or T2D restoration request, the CPU 81 in the virtual disk library apparatus 5 executes the transfer path selection processing program in the backup/restoration processing program 91, thereby checking if all the host paths 121 connected to the controller #0 controller unit 71 are in a closed state due to, e.g., a failure that occurs in all the host ports 84 of the controller #0 controller unit 71 in accordance with the procedure RT3 for transfer path selection processing shown in FIG. 18 (SP111).

Then, if all the host paths 121 connected to the controller #0 controller unit 71 are in a closed state (SP111: YES), the CPU 81 in the virtual disk library apparatus 5 checks if all the host paths 121 connected to the controller #1 controller unit 71 are in a closed state due to, e.g., a failure that occurs in all the host ports 84 of the controller #1 controller unit 71 (SP112).

Then, if all the host paths 121 connected to the controller #1 controller unit 71 are not in a closed state (SP112: NO), the CPU 81 in the virtual disk library apparatus 5 checks if D2T backup or T2D restoration can be performed in the controller #1 controller unit 71 (SP113).

Then, if D2T backup or T2D restoration can be performed in the controller #1 controller unit 71 (SP113: YES), the CPU 81 in the virtual disk library apparatus 5 designates the controller #1 controller unit 71 as a search target (selection target) for the host paths 121 (SP114).

On the other hand, if all the host paths 121 connected to the controller #0 controller unit 71 are not in a closed state (SP111: NO), the CPU 81 in the virtual disk library apparatus 5 checks if all the host paths 121 connected to the controller #1 controller unit 71 are in a closed state (SP115).

Then, if all the host paths 121 connected to the controller #1 controller unit 71 are in a closed state (SP115: YES), the CPU 81 in the virtual disk library apparatus 5 checks if D2T backup or T2D restoration can be performed in the controller #0 controller unit 71 (SP116).

Then, if D2T backup or T2D restoration can be performed in the controller #0 controller unit 71 (SP116: YES), the CPU 81 in the virtual disk library apparatus 5 designates the controller #0 controller unit 71 as a search target for the host paths 121 (SP117).

On the other hand, if all the host paths 121 connected to the controller #1 controller unit 71 are not in a closed state (SP115: NO), the CPU 81 in the virtual disk library apparatus 5 checks if D2T backup or T2D restoration can be performed in the controller #0 controller unit 71 (SP118).

Then, if D2T backup or T2D restoration cannot be performed in the controller #0 controller unit 71 (SP118: NO), the CPU 81 in the virtual disk library apparatus 5 proceeds to step SP113, and then repeats the same processing as for the above case.

Then, if D2T backup or T2D restoration can be performed in the controller #0 controller unit 71 (SP118: YES), the CPU 81 in the virtual disk library apparatus 5 checks if D2T backup or T2D restoration can be performed in the controller #1 controller unit 71 (SP119).

Then, if D2T backup or T2D restoration cannot be performed in the controller #1 controller unit 71 (SP119: NO), the CPU 81 in the virtual disk library apparatus 5 proceeds to step SP117, and then repeats the same processing as for the above case.

On the other hand, if D2T backup or T2D restoration can be performed in the controller #1 controller unit 71 (SP119: YES), the CPU 81 in the virtual disk library apparatus 5 refers to the column 93D for the number of tape transfer jobs in the path transfer control table 93, and checks if the total number of tape transfer jobs for the host paths 121 assigned to the controller #0 controller unit 71 is larger than the total number of tape transfer jobs for the host paths 121 assigned to the controller #1 controller unit 71 (SP120).

Then, if the total number of tape transfer jobs for the host paths 121 assigned to the controller #0 controller unit 71 is not larger than the total number of tape transfer jobs for the host paths 121 assigned to the controller #1 controller unit 71, i.e., if the total number of tape transfer jobs for the host paths 121 assigned to the controller #1 controller unit 71 is larger (SP120: NO), the CPU 81 in the virtual disk library apparatus 5 proceeds to step SP117, and then repeats the same processing as for the above case.

Then, if the total number of tape transfer jobs for the host paths 121 assigned to the controller #0 controller unit 71 is larger than the total number of tape transfer jobs for the host paths 121 assigned to the controller #1 controller unit 71 (SP120: YES), the CPU 81 in the virtual disk library apparatus 5 designates the controller #1 controller unit 71 as a search target for the host path 121 (SP121).

After that, the CPU 81 in the virtual disk library apparatus 5 refers to the column 93D for the number of tape transfer jobs in the path transfer control table 93, selects, from among the host paths 121 assigned to the controller unit 71 with a search-targeted controller number (controller #), the host path 121 with the smallest number of tape transfer jobs as a transfer host path 121 (SP122).

Subsequently, the CPU 81 in the virtual disk library apparatus 5 updates the path transfer control table 93 (SP123).

Specifically, the CPU 81 in the virtual disk library apparatus 5 refers to the column 93D for the number of tape transfer jobs in the path transfer control table 93, and adds, for the transfer host path 121, the tape transfer job for the job corresponding to the D2T backup request or T2D restoration request (increases the number of tape transfer jobs by "1").

Next, the CPU 81 in the virtual disk library apparatus 5 sets "normal" as the termination code for transfer path selection processing since transfer path selection processing has terminated normally (SP124).

Then, the CPU 81 in the virtual disk library apparatus 5 terminates the procedure RT3 for transfer path selection processing shown in FIGS. 17 and 18 (SP128).

Note that, if all the host paths 121 connected to the controller #1 controller unit 71 are in a closed state (SP112: YES), the CPU 81 in the virtual disk library apparatus 5 sets "error" as the termination code for transfer path selection processing, and then terminates the procedure RT3 for transfer path selection processing shown in FIGS. 17 and 18 (SP128).

Also, if D2T backup or T2D restoration cannot be performed in the controller #1 controller unit 71 (SP113: NO), or if D2T backup or T2D restoration cannot be performed in the controller #0 controller unit 71 (SP116: NO), the CPU 81 in the virtual disk library apparatus 5 sets "path busy" as the termination code for transfer path selection processing (SP126, SP127), and then terminates the procedure RT3 for transfer path selection processing shown in FIGS. 17 and 18 (SP128).

(5) Example of Transition Involved in Host Path Switching

Next, an example of transition involved in switching of the host paths 121 between the business server 2 and the tape library apparatus 74 (transition in the path transfer control table 93) in the storage system 1 in this embodiment will be described. Note that the right figure in each of the following figures shows controller numbers (controller #), to which the host paths 121 with host path numbers are assigned, and an apparatus, to which the host paths 121 are connected, and also the right figure promotes better understanding of transition involved in switching of the host paths 121. Note that "tape" in the figure indicates the tape library apparatus 74, and "Host" indicates the business server 2.

An example of transition involved in host path switching will be described with reference to FIGS. 19 to 22 ((1)-(2)-(3)-(4)).

Figure 19:
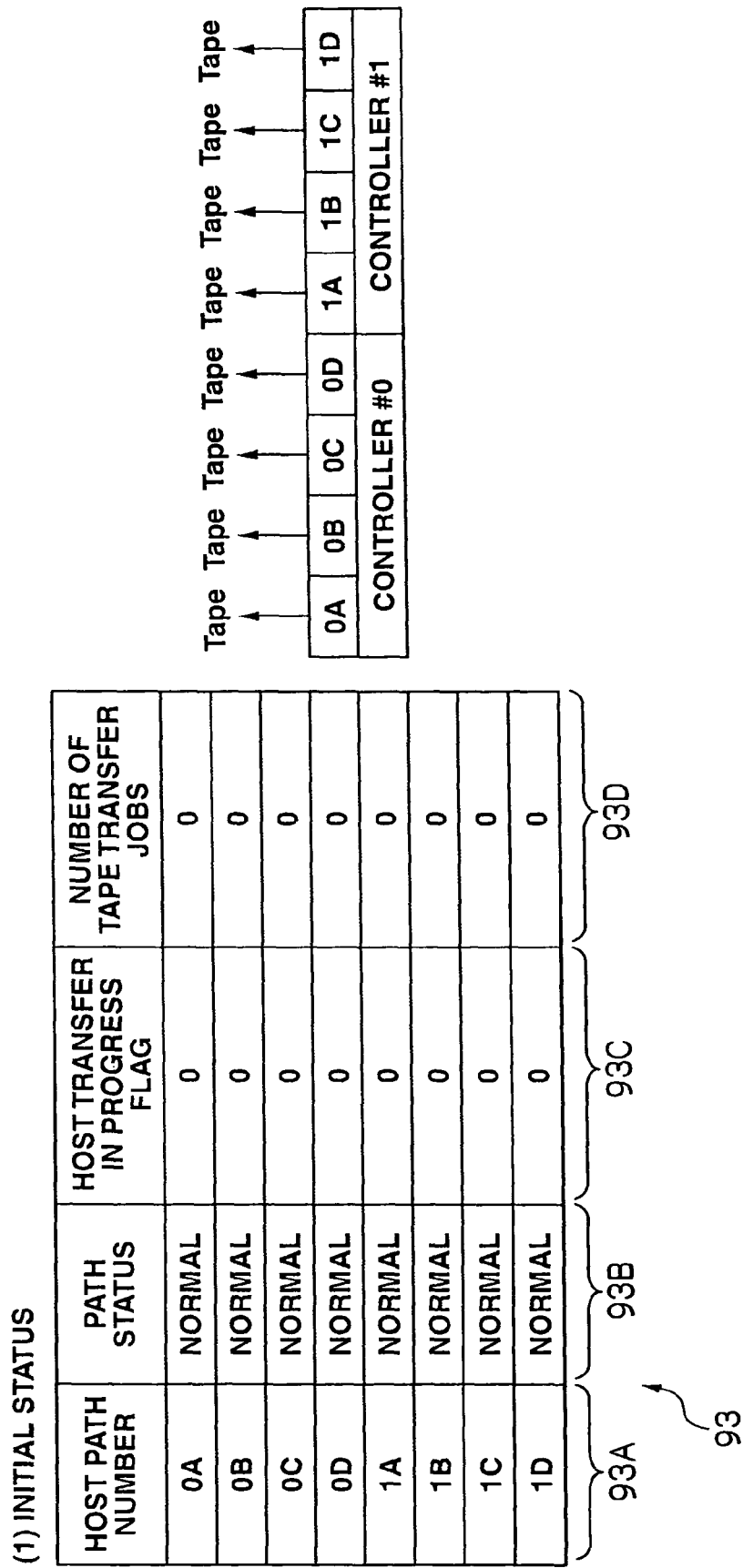
FIG. 19 is a conceptual diagram explaining an example of transition involved in host path switching.

FIG. 19 is a diagram showing the connection state of the host paths 121 in an initial state, and all the eight paths 121 are connected to the tape library apparatus 74.

Figure 20:
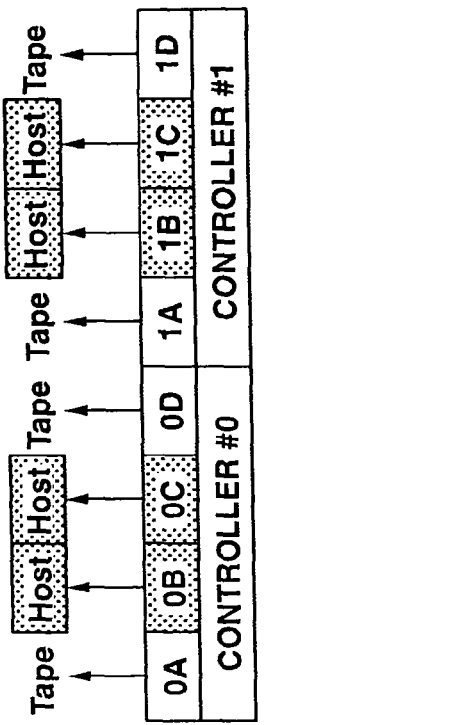
FIG. 20 is a conceptual diagram explaining an example of transition involved in host path switching.

FIG. 20 is a diagram showing the connection state of the host paths 121 when a two parallel transfer is started with the host paths 121 with host path numbers "0B" and "1B" and the host paths 121 with host path numbers "0C" and "1C" (after receipt of a request for D2D transfer in which the host paths 121 with host path numbers "0B", "1B", "0C", and "1C" are specified in accordance with the path switching control program 23 in the business server 2).

In this case, in accordance with the procedure RT1 for path switching processing, the host transfer in progress flags for the host path numbers "0B" and "1B" and the host transfer in progress flags for the host path numbers "0C" and "1C" are each changed from "0" to "1," and switching is conducted to have the host paths 121 with host path numbers "0B" and "1B" and the host paths 121 with host path numbers "0C" and "1C" connected to the business server 2 (in reality, the storage virtualization apparatus 4).

Note that, in this embodiment, D2D transfer is performed with the controller #0 controller unit 71 and the controller #1 controller unit 71 for duplexing. Therefore, the host paths 121 with host path numbers "0B" and "1B" are specified for a D2D transfer request.

FIG. 21 is a diagram showing the connection state of the host paths 121 when D2D transfer for the host paths 121 with host path numbers "0C" and "1C" terminates and then D2T backup for the host path 121 with a host path number "0A" is started (after receipt of a termination report on D2D transfer in which the host paths 121 with host path numbers "0C" and "1C" are specified in accordance with the path switching control program 23 in the business server 2).

In this case, the number of tape transfer jobs for the job corresponding to the D2T backup request, "1," is added to the number of tape transfer jobs for the transfer host path with host path number "0A" ("0" to "1") in accordance with the procedure RT3 for transfer path selection processing.

FIG. 22 is a diagram showing the connection state of the host paths 121 when D2D transfer for the host paths 121 with host path numbers "0B" and "1B" terminates and D2T backup for the host path 121 with a host path number "1A" is started (after receipt of a termination report on a D2D transfer in which the path switching control program 23 in the business server 2 specifies the host paths 121 with host path numbers "0B" and "1B").

In this case, the number of tape transfer jobs for the job corresponding to the D2T backup request, "1," is added to the number of tape transfer jobs for the transfer host path with host path number "1A" ("0" to "1") in accordance with the procedure RT3 for transfer path selection processing.

Meanwhile, another example of transition involved in host path switching will be described with reference to FIGS. 23 to 26 ((5)-(6)-(7)-(8)).

Figure 23:
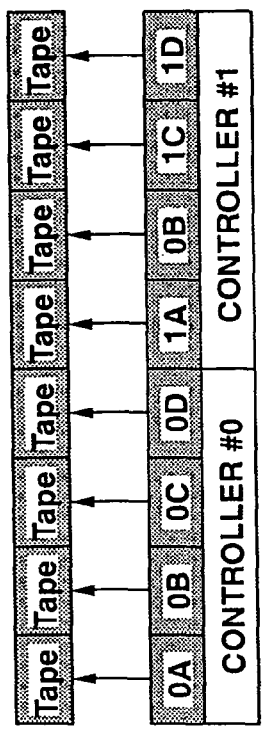
FIG. 23 is a conceptual diagram explaining an example of transition involved in host path switching.

FIG. 23 is a diagram showing the connection state of the host path 121 when eight parallel D2T backup is being executed with the host paths 121 with host path numbers "0A" to "1D."

FIG. 24 is a diagram showing the connection state of the host paths 121 when D2D transfer for the host paths 121 with host path numbers "0A" and "1A" is started during execution of eight parallel D2T backup (after receipt of a request for a D2D transfer in which the host paths 121 with host path numbers "0A" and "1A" are specified in accordance with the path switching control program 23 in the business server 2).

In this case, in accordance with the procedure RT1 for path switching processing, the host transfer in progress flags for the host path numbers "0A" and "1A" are each changed from "0" to "1," and switching is conducted to have the host paths 121 with host path numbers "0A" and "1A" connected to the business server 2.

Also, the number of tape transfer jobs for the job corresponding to the D2T backup request for the transfer host path with host path number "0A", "1," is added to the number of tape transfer jobs for each of the host paths with host path numbers "0B" and "1B" in accordance with the procedure RT3 for transfer path selection processing ("1" to "2").

Moreover, the number of tape transfer jobs for the job corresponding to the D2T backup request for the transfer host path with host path number "1A", "1," is added to the number of tape transfer jobs for each of the host paths with host path numbers "0C" and "1C" in accordance with the procedure RT3 for transfer path selection processing ("1" to "2").

FIG. 25 is a diagram showing the connection state of the host paths 121 when D2D transfer for the host paths 121 with host path numbers "0C" and "1C" is further started from the connection state in FIG. 24 (after receipt of a request for D2D transfer in which the host paths 121 with host path numbers "0C" and "1C" are specified in accordance with the path switching control program 23 in the business server 2).

In this case, in accordance with the procedure RT1 for path switching processing, the host transfer in progress flags for the host path numbers "0C" and "1C" are each changed from "0" to "1," and switching is conducted to have the host paths 121 with host path numbers "0C" and "1C" connected to the business server 2.

Also, the number of tape transfer jobs for the job corresponding to the D2T backup request for the transfer host path with host path number "0C", "1," is added to the number of tape transfer jobs for each of the host paths with host path numbers "0D" and "1D" in accordance with the procedure RT3 for transfer path selection processing ("1" to "2").

Moreover, the number of tape transfer jobs for the job corresponding to the D2T backup request for the transfer host path with host path number "1C", "1," is added to the number of tape transfer jobs for each of the host paths with host path numbers "0B" and "1B" in accordance with the procedure RT3 for transfer path selection processing ("2" to "3").

FIG. 26 is a diagram showing the connection state of the host paths 121 when D2D transfer for the host paths 121 with host path numbers "0B" and "1B" and the host paths 121 with host path numbers "0D" and "1D" is further started from the connection state in FIG. 25 (after receipt of a request for D2D transfer in which the host paths 121 with host path numbers "0B" and "1B" and the host paths 121 with host path numbers "0D" and "1D" are specified in accordance with the path switching control program 23 in the business server 2).

In this case, in accordance with the procedure RT1 for path switching processing, the host transfer in progress flags for the host path numbers "0B" and "1B" and the host transfer in progress flags for the host path numbers "0D" and "1D" are each changed from "0" to "1," and switching is conducted to have the host paths 121 with host path numbers "0B" and "1B" and the host paths 121 with host path numbers "0D" and "1D" connected to the business server 2.

Also, D2T backup for all the host paths 121 is interrupted while "path busy" is set, and waits to be restarted until one of the host paths 121 becomes free.

Meanwhile, another example of transition involved in host path switching will be described with reference to FIGS. 23 to 25 and FIG. 27 ((5)-(6)-(7)-(9)).

FIG. 27 is a diagram showing the connection state of the host paths 121 when D2D transfer for the host paths 121 with host path numbers "0C" and "1C" terminates in the connection state in FIG. 25 (after receipt of a termination report on D2D transfer in which the host paths 121 with host path numbers "0C" and "1C" are specified in accordance with the path switching control program 23 in the business server 2).

In this case, in accordance with the procedure RT3 for transfer path selection processing, the number of tape transfer jobs for the job corresponding to the D2T backup request for the host path with host path number "0B", "1," is subtracted ("3" to "2"), and the number of tape transfer jobs for the job corresponding to the D2T backup request for the host path with host path number "0C", "1," is added ("0" to "1") in order to re-adjust the load balance among the host paths 121.

Also in this case, in accordance with the procedure RT3 for transfer path selection processing, the number of tape transfer jobs for the job corresponding to the D2T backup request for the host path with host path number "1B", "1," is subtracted ("3" to "2"), and the number of tape transfer jobs for the job corresponding to the D2T backup request for the host path with host path number "1C", "1," is added ("0" to "1") in order to re-adjust the load balance among the host paths 121.

As described above, switching is conducted to change the host path 121, which has been assigned to the tape library apparatus 74, into the host path for data transfer with the business server 2 according to the request from the business server 2. Here, if the host path 121 specified according to the request from the business server 2 is executing backup/restoration processing, backup/restoration processing is executed by another free host path 121.

Therefore, a data transfer band can be effectively used, and accordingly, the D2D transfer time and the data backup/restoration time can be shortened, enabling the improvement of the performance of the entire system.

The present invention can be widely utilized in storage systems that back up or restore data by using an externally connected storage apparatus.

What is claimed is:

1. A storage system comprising:
   a host apparatus;
   a virtualization apparatus including a storage apparatus and a first controller apparatus connected to the host apparatus and having a connection to the storage apparatus, the storage apparatus including a logical volume that stores data sent from the host apparatus and a virtual volume associated with the logical volume that is used for maintaining a copy of the data stored in the logical volume; and
   a virtual disk library apparatus including a tape library apparatus and a second controller apparatus connected to the virtualization apparatus, the second controller apparatus including an actual volume associated with the virtual volume used for storing the copy of the data maintained using the virtual volume, the tape library apparatus having a tape that stores the copy of the data stored in the actual volume,
   wherein the second controller apparatus has a path switching unit for conducting switching between a first plurality of paths that connect the second controller apparatus to the tape library apparatus and a second plurality of paths that connect the second controller apparatus to the first controller apparatus according to data transfer requests sent from the host apparatus,
   wherein the path switching unit sets the first plurality of paths to connect the second controller apparatus to the tape library apparatus in an initial state,
   wherein, upon the second controller apparatus receiving a first request sent from the host apparatus to transfer the copy of the data stored in the logical volume to the virtual volume using a specified path of the second plurality of paths, the path switching unit conducts switching to the specified path from a first path of the first plurality of paths that corresponds to the specified path to connect the second controller apparatus to the first controller apparatus, and the first controller apparatus transfers the copy of the data stored in the logical volume of the storage apparatus from the logical volume using the connection to the storage apparatus to the second controller apparatus for storage on the actual volume using the specified path,
   wherein, upon transfer of the copy of the data stored in the logical volume to the second controller apparatus, the path switching unit conducts switching from the specified path to the first path to connect the second controller apparatus to the tape library apparatus, and
   wherein, upon the second controller apparatus receiving a second request sent from the host apparatus to transfer the copy of the data stored in the actual volume to the tape, the path switching unit selects a free path from the first plurality of paths, and the second controller apparatus transfers the copy of the data stored on the actual volume to the tape library apparatus for storage on the tape using the free path.

2. The storage system according to claim 1, wherein when the first path is executing data transfer between the second controller apparatus and the tape library apparatus upon the second controller apparatus receiving the first request, the path switching unit conducts switching to have a free path of the first plurality of paths conduct the data transfer between the controller apparatus and the tape library apparatus and then conducts switching from the first path to the specified path.

3. The storage system according to claim 2, wherein, when the second controller apparatus is transferring the copy of the data stored on the actual volume to the tape library apparatus, the second controller apparatus performs load balancing on the first and second pluralities of paths.

4. The storage system according to claim 2, wherein the second controller apparatus is interrupted from transferring the copy of the data stored on the actual volume to the tape library apparatus when all of the second plurality of paths are in use for data transfer between the first controller apparatus and the second controller apparatus.

5. The storage system according to claim 1, wherein the selected path selected by the path switching unit has a lowest load of all paths of the first plurality of paths.

6. A path switching method for a storage system that includes a host apparatus; a virtualization apparatus including a storage apparatus and a first controller apparatus connected to the host apparatus and having a connection to the storage apparatus, the storage apparatus including a logical volume that stores data sent from the host apparatus and a virtual volume associated with the logical volume that is used for maintaining a copy of the data stored in the logical volume; and a virtual disk library apparatus including a tape library apparatus and a second controller apparatus connected to the virtualization apparatus, the second controller apparatus including an actual volume associated with the virtual volume used for storing the copy of the data maintained using the virtual volume, the tape library apparatus having a tape that stores the copy of the data stored in the actual volume, the path switching method comprising:
   switching between a first plurality of paths that connect the second controller apparatus to the tape library apparatus and a second plurality of paths that connect the second controller apparatus to the first controller apparatus to the first plurality of paths in an initial state,
   upon the second controller apparatus receiving a first request sent from the host apparatus to transfer the copy of the data stored in the logical volume to the virtual volume using a specified path of the second plurality of paths, switching to the specified path from a first path of the first plurality of paths that corresponds to the specified path to allow the first controller apparatus to transfer the copy of the data stored in the logical volume of the storage apparatus from the logical volume using the connection to the storage apparatus to the second controller apparatus for storage on the actual volume using the specified path,
   upon transfer of the copy of the data stored in the logical volume to the second controller apparatus, switching from the specified path to the first path to connect the second controller apparatus to the tape library apparatus, and
   upon the second controller apparatus receiving a second request sent from the host apparatus to transfer the copy of the data stored in the actual volume to the tape, selecting a free path from the first plurality of paths for the second controller apparatus to use to transfer the copy of the data stored on the actual volume to the tape library apparatus for storage on the tape.

7. The path switching method according to claim 6, further comprising, when the first path is executing data transfer between the second controller apparatus and the tape library apparatus upon the second controller apparatus receiving the first request, switching to have a free path of the first plurality of paths conduct the data transfer between the controller apparatus and the tape library apparatus and then switching from the first path to the specified path.

8. The path switching method according to claim 7, further comprising, when the second controller apparatus is transferring the copy of the data stored on the actual volume to the tape library apparatus, performing load balancing on the first and second pluralities of paths.

9. The path switching method according to claim 7, further comprising interrupting the second controller apparatus from transferring the copy of the data stored on the actual volume to the tape library apparatus when all of the second plurality of paths are in use for data transfer between the first controller apparatus and the second controller apparatus.

10. The path switching method according to claim 6, wherein the selected path has a lowest load of all paths of the first plurality of paths.

11. A storage system comprising:
a host apparatus;
a virtualization apparatus including a storage apparatus and a first controller apparatus connected to the host apparatus and having a connection to the storage apparatus, the storage apparatus including a logical volume that stores data sent from the host apparatus and a virtual volume associated with the logical volume that is used for maintaining a copy of the data stored in the logical volume; and
a virtual disk library apparatus including a tape library apparatus and a second controller apparatus connected to the virtualization apparatus, the second controller apparatus including an actual volume associated with the virtual volume used for storing the copy of the data maintained using the virtual volume, the tape library apparatus having a tape that stores the copy of the data stored in the actual volume,
wherein the second controller apparatus has a path switching unit for conducting switching between a first plurality of paths that connect the second controller apparatus to the tape library apparatus and a second plurality of paths that connect the second controller apparatus to the first controller apparatus according to data transfer requests sent from the host apparatus,
wherein the path switching unit sets the first plurality of paths to connect the second controller apparatus to the tape library apparatus in an initial state,
wherein, upon the second controller apparatus receiving a first request sent from the host apparatus to transfer the copy of the data stored in the tape to the virtual volume, the path switching unit selects a free path from the first plurality of paths and the second controller apparatus transfers the copy of the data stored on the tape from the tape library apparatus to the secondary controller apparatus for storage on the actual volume using the free path,
wherein, upon the second controller apparatus receiving a second request sent from the host apparatus to transfer the copy of the data from the virtual volume to the logical volume using a specified path of the second plurality of paths, the path switching unit switches from a first path of the first plurality of paths to the specified path to connect the second controller apparatus to the first controller apparatus, and the second controller apparatus transfers the copy of the data stored in the actual volume to the first controller apparatus using the specified path and the first controller apparatus transfers the copy of the data received from the second controller apparatus to the storage apparatus for storage on the logical volume using the connection to the storage apparatus, and
wherein, upon transfer of the copy of the data stored in the actual volume to the first controller apparatus, the path switching unit switches from the specified path to the first path to connect the second controller apparatus to the tape library apparatus.

12. A storage system comprising:
a host apparatus;
a virtualization apparatus including a storage apparatus and a first controller apparatus connected to the host apparatus and having a connection to the storage apparatus, the storage apparatus including a logical volume that stores data sent from the host apparatus and a virtual volume associated with the logical volume that is used for maintaining a copy of the data stored in the logical volume; and
a virtual disk library apparatus including a tape library apparatus and a second controller apparatus connected to the virtualization apparatus, the second controller apparatus including an actual volume associated with the virtual volume used for storing the copy of the data maintained using the virtual volume, the tape library apparatus having a tape that stores the copy of the data stored in the actual volume,
wherein the second controller apparatus has a path switching unit for conducting switching between a first plurality of paths that connect the second controller apparatus to the tape library apparatus and a second plurality of paths that correspond in number to the first plurality of paths and connect the second controller apparatus to the first controller apparatus according to data transfer requests sent from the host apparatus,
wherein the path switching unit sets the first plurality of paths to connect the second controller apparatus to the tape library apparatus in an initial state,
wherein, upon receiving a request sent from the host apparatus, the second controller apparatus determines whether the request is to transfer the copy of the data between the logical volume and the virtual volume using a specified path of the second plurality of paths,
wherein, upon determining that the request is to transfer the copy of the data between the logical volume and the virtual volume, the second controller determines whether a first path of the first plurality of paths that corresponds to the specified path is transferring data between the second controller apparatus and the tape library apparatus,
wherein, upon the second controller determining that the first path is transferring data, the path switching unit selects a free path from the first plurality of paths and conducts switching from the first path to the free path for transferring data between the second controller apparatus and the tape library apparatus,
wherein, upon the second controller determining that the first path is not transferring data or upon termination of the first path transferring data, the path switching unit conducts switching from the first path to the specified path to connect the second controller apparatus to the first controller apparatus,
wherein the connection between the first controller apparatus and the storage apparatus is used to transfer the copy of the data between the first controller apparatus and the logical volume of the storage apparatus and the specified path is used to transfer the copy of the data between the first controller apparatus and the actual volume of the second controller apparatus according to the request, and wherein, upon transfer of the copy of the data according to the request, the path switching unit conducts switching from the specified path to the first path to connect the second controller apparatus to the tape library apparatus.

13. A storage system comprising:

a host apparatus;

a virtualization apparatus including a storage apparatus and a first controller apparatus connected to the host apparatus and the storage apparatus, the storage apparatus including a logical volume that stores data sent from the host apparatus and a virtual volume associated with the logical volume that is used for maintaining a copy of the data stored in the logical volume; and a virtual disk library apparatus including a tape library apparatus and a second controller apparatus connected to the virtualization apparatus, the second controller apparatus including an actual volume associated with the virtual volume used for storing the copy of the data maintained using the virtual volume, the tape library apparatus having a tape that stores the copy of the data stored in the actual volume, wherein the second controller apparatus has a path switching unit for conducting switching between individual paths of a first plurality of paths that connect the second controller apparatus to the tape library apparatus and individual paths of a second plurality of paths that correspond in number to the individual paths of the first plurality of paths and connect the second controller apparatus to the first controller apparatus according to data transfer requests sent from the host apparatus, wherein the path switching unit sets the first plurality of paths to connect the second controller apparatus to the tape library apparatus in an initial state, wherein, upon the second controller apparatus receiving a request sent from the host apparatus to transfer the copy of the data between the virtual volume and the tape, the path switching unit selects a first individual path from the first plurality of paths as a potential transfer path, and the second controller apparatus determines whether the first individual path is transferring data between second controller and the tape library apparatus or a second individual path of the second plurality of paths that corresponds to the first individual path is transferring data between the second controller apparatus and the first controller apparatus, wherein, upon determining that the first individual path and the second individual path are both not transferring data, the second controller determines whether the first individual path is being reviewed, wherein, upon determining that the first individual path is being reviewed, the path switching unit selects a third individual path from the first plurality of paths as the potential transfer path, and the second controller apparatus determines whether the third individual path is transferring data between second controller and the tape library apparatus or a fourth individual path of the second plurality of paths that corresponds to the third individual path is transferring data between the second controller apparatus and the first controller apparatus, and wherein, upon the second controller apparatus determining that the first individual path is not being reviewed or that the third individual path and the fourth individual path are both not transferring data, the selected potential transfer path is used to transfer the copy of the data between the second controller apparatus and the tape library apparatus according to the request, and the second controller apparatus performs load balancing on the first and second pluralities of paths.

* * * * *

UNITED STATES PATENT AND TRADEMARK OFFICE
CERTIFICATE OF CORRECTION

PATENT NO. : 7,831,781 B2
APPLICATION NO. : 12/007332
DATED : November 9, 2010
INVENTOR(S) : Usami It is certified that error appears in the above-identified patent and that said Letters Patent is hereby corrected as shown below:

On the Title Page:

Under Item (73) please amend the Assignee by adding as the second assignee

"Hitachi Computer Peripherals Co., Ltd., Kanagawa-Ken, Japan"

Signed and Sealed this
Eighth Day of January, 2013

David J. Kappos
*Director of the United States Patent and Trademark Office*